(12) United States Patent
Carbune et al.

(10) Patent No.: US 11,264,032 B2
(45) Date of Patent: *Mar. 1, 2022

(54) USING TEXTUAL INPUT AND USER STATE INFORMATION TO GENERATE REPLY CONTENT TO PRESENT IN RESPONSE TO THE TEXTUAL INPUT

(71) Applicant: Google LLC, Mountain View, CA (US)

(72) Inventors: Victor Carbune, Basel (CH); Daniel Keysers, Stallikon (CH); Thomas Deselaers, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,143

(22) Filed: Apr. 20, 2020

(65) Prior Publication Data

US 2020/0251112 A1 Aug. 6, 2020

Related U.S. Application Data

(63) Continuation of application No. 16/258,035, filed on Jan. 25, 2019, now Pat. No. 10,650,820, which is a
(Continued)

(51) Int. Cl.
*G10L 15/00* (2013.01)
*G10L 15/22* (2006.01)
(Continued)

(52) U.S. Cl.
CPC .......... *G10L 15/22* (2013.01); *G06F 16/3331* (2019.01); *G06F 16/9535* (2019.01);
(Continued)

(58) Field of Classification Search
None
See application file for complete search history.

(56) References Cited

U.S. PATENT DOCUMENTS 7,720,784 B1 5/2010 Froloff
8,660,849 B2 2/2014 Gruber et al.
(Continued)

OTHER PUBLICATIONS

IPO, First Examination Report for Indian Patent Application No. 201947003726, dated Feb. 15, 2021, 7 pages.
(Continued)

*Primary Examiner* — Satwant K Singh
(74) *Attorney, Agent, or Firm* — IP Spring

(57) ABSTRACT

Methods, apparatus, and computer readable media related to receiving textual input of a user during a dialog between the user and an automated assistant (and optionally one or more additional users), and generating responsive reply content based on the textual input and based on user state information. The reply content is provided for inclusion in the dialog. In some implementations, the reply content is provided as a reply, by the automated assistant, to the user's textual input and may optionally be automatically incorporated in the dialog between the user and the automated assistant. In some implementations, the reply content is suggested by the automated assistant for inclusion in the dialog and is only included in the dialog in response to further user interface input.

20 Claims, 15 Drawing Sheets

Related U.S. Application Data continuation of application No. 15/252,049, filed on Aug. 30, 2016, now Pat. No. 10,192,551.

(51) Int. Cl.

| | | |
|---|---|---|
| *G06F 16/33* | (2019.01) | |
| *G06F 16/9535* | (2019.01) | |
| *G06Q 10/10* | (2012.01) | |
| *G10L 15/06* | (2013.01) | |
| *G10L 15/16* | (2006.01) | |
| *G10L 15/18* | (2013.01) | |
| *G10L 15/26* | (2006.01) | |
| *G06F 3/0482* | (2013.01) | |

(52) U.S. Cl.
CPC .......... *G06Q 10/107* (2013.01); *G10L 15/063* (2013.01); *G10L 15/16* (2013.01); *G10L 15/1815* (2013.01); *G10L 15/26* (2013.01); *G06F 3/0482* (2013.01)

(56) References Cited

U.S. PATENT DOCUMENTS

| | | | |
|---|---|---|---|
| 8,670,979 | B2 | 3/2014 | Gruber et al. |
| 8,706,503 | B2 | 4/2014 | Cheyer et al. |
| 8,731,942 | B2 | 5/2014 | Cheyer et al. |
| 8,799,000 | B2 | 8/2014 | Guzzoni et al. |
| 8,892,446 | B2 | 11/2014 | Cheyer et al. |
| 8,903,716 | B2 | 12/2014 | Chen et al. |
| 8,930,191 | B2 | 1/2015 | Gruber et al. |
| 8,942,986 | B2 | 1/2015 | Cheyer et al. |
| 9,117,447 | B2 | 8/2015 | Gruber et al. |
| 9,318,108 | B2 | 4/2016 | Gruber et al. |
| 9,548,050 | B2 | 1/2017 | Gruber et al. |
| 10,192,551 | B2 * | 1/2019 | Carbune .................. G10L 15/16 |
| 10,276,170 | B2 * | 4/2019 | Gruber ................ G06F 16/9537 |
| 10,594,638 | B2 * | 3/2020 | Bostick .................. H04L 51/10 |
| 10,650,820 | B2 * | 5/2020 | Carbune .............. G06Q 10/107 |
| 10,706,841 | B2 * | 7/2020 | Gruber .................... G10L 15/26 |
| 2009/0128567 | A1 | 5/2009 | Shuster et al. |
| 2013/0063256 | A1 | 3/2013 | Tartz et al. |
| 2013/0110518 | A1 | 5/2013 | Gruber et al. |
| 2013/0152000 | A1 | 6/2013 | Liu et al. |
| 2013/0275164 | A1 | 10/2013 | Gruber et al. |
| 2014/0277735 | A1 | 9/2014 | Breazeal |
| 2016/0021038 | A1 | 1/2016 | Woo et al. |
| 2016/0189717 | A1 | 6/2016 | Kannan et al. |
| 2016/0241500 | A1 | 8/2016 | Bostick et al. |
| 2017/0178626 | A1 | 6/2017 | Gruber et al. |
| 2017/0242860 | A1 | 8/2017 | Souche et al. |

OTHER PUBLICATIONS

WIPO, International Search Report for International Patent Application No. PCT/US2017/049225, dated Nov. 10, 2017, 4 Pages.

WIPO, Written Opinion for International Patent Application No. PCT/US2017/049225, dated Nov. 10, 2017, 7 Pages.

EPO, Communication Under Rule 71(3) EPC for European Patent Application No. 17768889.2, dated Feb. 28, 2020, 7 pages.

WIPO, International Preliminary Report on Patentability for International Patent Application No. PCT/US2017/049225, dated Nov. 15, 2018, 16 pages.

USPTO, First Action Interview, Office Action Summary for U.S. Appl. No. 16/258,035, dated Aug. 2, 2019, 15 pages.

USPTO, Notice of Allowance for U.S. Appl. No. 16/258,035, dated Jan. 9, 2020, 9 pages.

USPTO, Preinterview first office action mailed for U.S. Appl. No. 16/258,035, dated May 8, 2019, 13 pages.

USPTO, First Action Interview, Pre-Interview Communication for U.S. Appl. No. 16/258,035, dated May 8, 2019, 13 pages.

USPTO, Final Office Action for U.S. Appl. No. 16/258,035, dated Oct. 31, 2019, 7 pages.

Vinyals, et al., "A Neural Conversational Model", arXiv preprint arXiv:1506.05869, 2015, 8 Pages.

Wikipedia Contributors, "ELIZA", Wikipedia, The Free Encyclopedia, https://en.wikipedia.org/w/index.php?title=ELIZA?oldid=735311847, accessed Aug. 30, 2016, 6 Pages.

Wikipedia Contributors, "Sentiment Analysis", Wikipedia, The Free Encyclopedia, https://en.wikipedia.org/w/index.php?title=Sentiment_analysis&oldid=735304080, accessed Aug. 30, 2016, 7 Pages.

* cited by examiner

USING TEXTUAL INPUT AND USER STATE INFORMATION TO GENERATE REPLY CONTENT TO PRESENT IN RESPONSE TO THE TEXTUAL INPUT

CROSS-REFERENCE TO RELATED APPLICATIONS

This application is a continuation of U.S. patent application Ser. No. 16/258,035, filed Jan. 25, 2019 and titled USING TEXTUAL INPUT AND USER STATE INFORMATION TO GENERATE REPLY CONTENT TO PRESENT IN RESPONSE TO THE TEXTUAL INPUT, which is a continuation of U.S. patent application Ser. No. 15/252,049, filed Aug. 30, 2016 and titled USING TEXTUAL INPUT AND USER STATE INFORMATION TO GENERATE REPLY CONTENT TO PRESENT IN RESPONSE TO THE TEXTUAL INPUT (now U.S. Pat. No. 10,192,551), the contents of both of which are incorporated herein by reference in their entirety.

BACKGROUND

Automated assistants (also known as "personal assistant modules", "mobile assistants", or "chat bots") may be interacted with by a user via a variety of computing devices, such as smart phones, tablet computers, wearable devices, automobile systems, standalone automated assistant devices, and so forth. The automated assistants receive textual input from the user (e.g., typed and/or spoken) and respond with responsive textual output (e.g., visual and/or audible).

SUMMARY

This specification is directed to methods, apparatus, and computer readable media related to receiving textual input of a user during a dialog between the user and an automated assistant (and optionally one or more additional users), and generating responsive reply content based on the textual input and based on user state information. The reply content is provided for inclusion in the dialog. In some implementations, the reply content is provided as a reply, by the automated assistant, to the user's textual input and may optionally be automatically incorporated in the dialog between the user and the automated assistant. In some implementations, the reply content is suggested by the automated assistant for inclusion in the dialog and is only included in the dialog in response to further user interface input.

In many implementations, the user state information used to generate the reply content is based at least in part on one or more indicators that are in addition to the textual input itself, such as indicators based on one or more sensors (e.g., camera, microphone, keyboard sensors, touchscreen sensors, heart rate sensor) of a computing device of at least one of the users participating in the dialog that includes the automated assistant. In some implementations, the user state information indicates the current sentiment of the user. In some implementations, the user state information additionally or alternatively indicates the current sentiment of another user that is also engaged in the dialog that includes the automated assistant and the user (e.g., a dialog that includes two or more users and the automated assistant).

As one example, assume textual input of "hello" provided by a user to an automated assistant during a dialog that includes the user and the automated assistant. If user state information of the user indicates the user is stressed, textual reply content of "hi, what can I do to help?" may be provided by the automated assistant as a reply to the user's textual input. If the user state information indicates the user is jovial, textual reply content of "howdy, can I help?" may instead be provided. As described in more detail herein, in some implementations different reply contents may be provided based on modifying a "default" initial textual output from a text generation engine in view of the user state information. For instance, the initial textual output of "hi, can I help?" may be modified with additional content that is dependent on user state information as indicated in the preceding examples (e.g., replacing "hi" with "howdy" or adding "what" and "do" to "can I help").

As another example, assume textual input of "I'm bored" provided by a user to an automated assistant during a dialog that includes the user and the automated assistant. If user state information of the user indicates the user is jovial, textual reply content of "want to hear some jokes?" may be provided by the automated assistant as a reply to the textual input. If the user state information indicates the user is sad, textual reply content of "anything you want to talk about?" may instead be provided. As described in more detail herein, in some implementations the different reply contents may be provided by selecting, based on the user state information, from multiple reply options identified for the textual input. Additional description of the above and additional techniques are provided below.

Some of the above mentioned and other implementations of the specification may achieve various technical advantages. For example, some implementations of generating reply content based on user state information may enable a more concise dialog to be achieved, while still satisfying informational and/or other needs of the user(s) included in the dialog. This may reduce the use of various computational resources, such as resources of computing device(s), that are required for visually and/or audibly presenting the dialog to the user(s). As yet another example, some implementations that generate reply content that includes interactive user interface elements that are based on user state information may increase the likelihood that such interactive elements are beneficial to one or more user(s) included in the dialog—and lessen the chance that computational resources are expended in association with irrelevant interactive elements. Additional or alternative technical advantages may be achieved, such as one or more described elsewhere in this specification.

In some implementations, a method performed by one or more processors is provided that includes receiving textual input. The textual input is based on user interface input generated by a user via one or more user interface input devices of a computing device of the user and the user interface input is generated by the user as part of a dialog that includes the user and an automated assistant implemented by one or more of the processors. The method further includes determining user state information for the user, generating reply content based on both the textual input and the user state information, and providing the reply content in response to the user interface input. The user state information identifies a state of the user, is in addition to the textual input, and is based on sensor data generated by the computing device or an additional computing device of the user. The reply content is provided for inclusion in the dialog in response to the textual input and the reply content is provided for presentation via one or more user interface output devices.

These and other implementations of technology disclosed herein may optionally include one or more of the following features.

In some implementations, a transcript of the dialog between the user and the automated assistant is displayed in a graphical user interface rendered by one of the user interface output devices of the computing device of the user. In some of those implementations, providing the reply content includes incorporating the reply content into the transcript for display along with previous content of the dialog. Incorporating the reply content into the transcript may include transmitting, via one or more network interfaces, a command to the computing device, where the command causes the computing device to incorporate the reply content into the transcript.

In some implementations, generating the reply content based on both the textual input and the user state information includes: providing the textual input to a text generation engine; receiving an initial textual output from the text generation engine; and generating the reply content by modifying the initial textual output based on the user state information. In some of those implementations, modifying the initial textual output based on the user state information includes: applying input to a model stored in one or more computer readable media, where the input is based on one or more segments of the initial textual output; and generating, over the model and based on the input, output that indicates one or more terms for modifying the initial textual output. In some versions of those implementations, the model includes mappings of neutral textual segments to textual segments that are specific to the user state, the input applied to the model is one or more of the segments of the initial textual output, and the output generated over the model includes at least one of the textual segments that are specific to the user state. In some other version of those implementations, the method further includes selecting the model based on conformance between the user state information and one or more user state identifiers assigned to the model. In yet other versions of those implementations, the method further includes: applying, to the model, additional input that is based on the user state information. Generating the output over the model may be further based on the additional input. The model may be a trained machine learning model and the method may further include generating the trained machine learning model based on a plurality of training examples. Each of the training examples may include: training example input based on a corresponding neutral text segment and corresponding user state information; and training example output based on a corresponding modified text segment that is a modification of the corresponding neutral text segment in view of the corresponding user state information. Generating the trained machine learning model may include training the trained machine learning model based on application of the training example input of the training examples and backpropagation based on the training example output of the training examples.

In some implementations, the reply content includes at least one selectable graphical element that, when selected via further user interface input, causes the computing device of the user to present additional content to the user. In some versions of those implementations, generating the reply content based on both the textual input and the user state information includes: issuing a search of one or more databases based on both the textual input and the user state information; receiving one or more search results in response to issuing the search; and incorporating one or more of the search results into the reply content. The selectable graphical element may be associated with one of the search results. Issuing the search based on both the textual input and the user state information may include: determining a search parameter based on the textual input; determining an additional search parameter based on the user state information. The additional search parameter may be either: a search term used to identify responsive content on which the search results are based, or a ranking parameter used to rank the search results. In some other version of implementations where the reply content includes at least one selectable graphical element, selection of the selectable graphical element may cause the computing device of the user to establish a network connection with a computing device of an additional user. The additional content may indicate initiation of a new dialog with the additional user.

In some implementations, determining the user state information includes: identifying a plurality of user state indicators based on the sensor data; applying the user state indicators as input to at least one user state model stored in one or more computer readable media; and generating, over the at least one user state model and based on the input, output that indicates the user state information. In some of those implementations, the at least one user state model includes a trained sentiment classifier.

In some implementations, the sensor data includes user interface sensor data that is based on the user interface input and determining the user state information includes determining the user state information based on the user interface input sensor data.

In some implementations, generating the reply content based on both the textual input and the user state information includes: determining a plurality of reply options based on the textual input; selecting one of the reply options based on conformity of the selected one of the reply options to the user state information; and generating the reply content based on the selected one of the reply options.

In some implementations, generating the reply content based on both the textual input and the user state information includes: providing the textual input to a text generation engine; receiving at least a first textual output and a second textual output from the text generation engine; and selecting, based on the user state information, one of the first textual output and the second textual output to utilize as the reply content.

In some implementations, the dialog includes an additional user and the method further includes determining additional user state information for the additional user. Generating the reply content may be further based on the additional user state information.

In some implementations, generating the reply content based on the user state information includes determining a style feature of the reply content based on the user state information.

In some implementations, the sensor data on which the user state information is based is from a plurality of sensors of the computing device or the additional computing device.

In some implementations, a method performed by one or more processors is provided that includes receiving textual input. The textual input is based on user interface input generated via one or more user interface input devices of a computing device of a user or an additional user. The user interface input is generated as part of a dialog that includes the user, the additional user, and an automated assistant implemented by one or more of the processors. The method further includes: determining user state information for at least one of: the user and the additional user; generating reply content based on both the textual input and the user state information; and providing the reply content in response to the textual input. The reply content is provided for inclusion in the dialog and the reply content is provided for presentation via one or more user interface output devices.

These and other implementations of technology disclosed herein may optionally include one or more of the following features.

In some implementations, providing the reply content includes incorporating the reply content in the dialog for presentation to the user and to the additional user.

In some implementations, determining the user state information includes determining the user state information for both the user and the additional user.

In some implementations, the user interface input on which the textual input is based is from the computing device of the additional user, the user state information is for at least the additional user, and providing the reply content includes providing the reply content for presentation to the user as a suggested reply, by the user, to the textual input.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
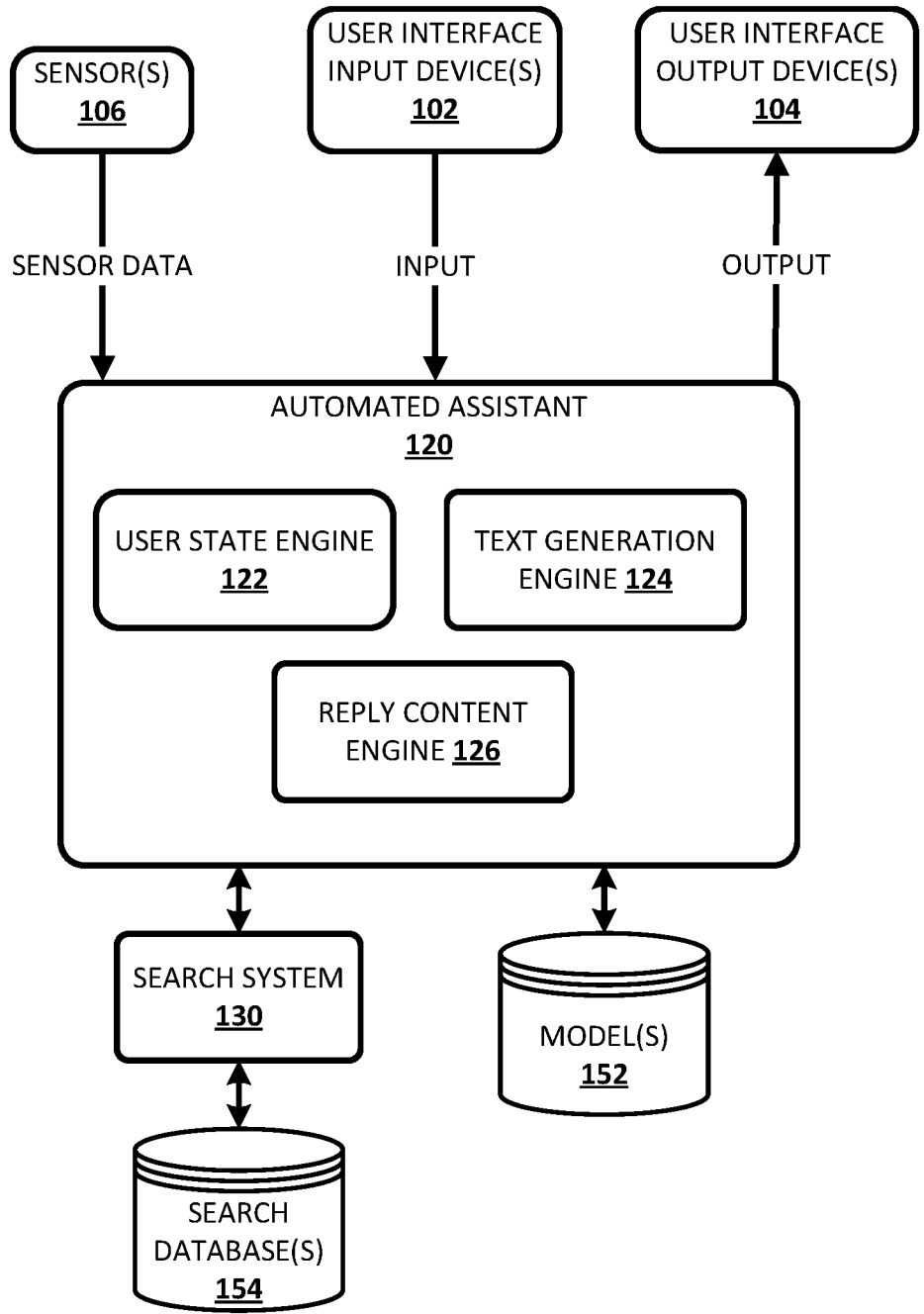
FIG. 1 is a block diagram of an example environment in which implementations disclosed herein may be implemented.

Implementations described herein relate to receiving textual input of a user during a dialog that involves the user, an automated assistant, and optionally one or more additional users—and generating responsive reply content based on the textual input. The textual input that is provided by the user may be textual input that initiates the dialog or it may be a continuation of a previously initiated dialog. The textual input may be natural language free-form input, such as textual input that is based on user interface input generated by the user via one or more user interface input devices (e.g., based on typed input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

As described herein, in many situations reply content generated by an automated assistant in response to textual input of a user is generated based on the textual input and based on user state information. The user state information on which the reply content is generated may be user state information of the user and/or of other users engaged in the dialog that includes the automated assistant.

The generated reply content is provided, by the automated assistant, for inclusion in the dialog. In some implementations, the reply content is automatically included in the dialog by the automated assistant as a reply, by the automated assistant, to the textual input. In some implementations, the reply content is suggested by the automated assistant for inclusion in the dialog and is only included in the dialog in response to further user interface input. In some versions of those implementations, the further user interface input is input of the user that provided the textual input and the inclusion of the reply content in the dialog is as a reply to the textual input by the automated assistant. In some other versions of those implementations, the further user interface input is input of an additional user involved in the dialog and the inclusion of the reply content in the dialog is as a reply to the textual input by the other user involved in the dialog.

Various types of reply content may be provided in response to textual input provided by a user. Moreover, various techniques may be utilized to determine the user state information and/or to determine the reply content based on both the textual input and the user state information. Some of these techniques are described in more detail below with reference to the figures.

Automated assistants may receive textual input from a user and respond with textual output that is tailored to the received textual input. However, many conventional automated assistants may fail to take into account any user state information that is not explicitly contained in the received textual input. Moreover, many conventional automated assistants may fail to provide responsive non-textual output (e.g., interactive user interface elements, changes to an application state) that is based on user state information.

Such failure to take into account user state information may lead to undue utilization of computational resources and/or other technical problems in various situations. For example, in some situations, failing to take into account user state information may cause excess dialog to occur between a user and the automated assistant to resolve informational or other needs of the user. Such excess dialog may consume various computational resources, such as resources required to render a presentation of the dialog, communicate between a computing device of the user and remotely located components of an automated assistant and/or of other user's computing devices, etc. Also, for example, in some situations failing to take into account user state information may cause the user to prematurely abandon the dialog and seek to resolve his or her needs using a more computationally expensive alternative technique. As yet another example, failing to provide responsive interactive user interface elements that are based on user state information may cause interactive user interface elements to be provided and selected by the user—only to have the user ignore the responsive output due to the elements not being tailored to the user state information. This may cause a client computing device to unnecessarily perform action(s) in response to the selection, such as opening a new application, rendering a new interface, retrieving content over a network, etc.

Some implementations of the specification may address the above-mentioned and/or additional technical problems via one or more technical solutions. For example, some implementations of generating reply content based on user state information may enable a more concise dialog to be achieved, while still satisfying informational and/or other needs of the user(s) included in the dialog. This may reduce the use of various computational resources, such as resources of computing device(s), that are required for visually and/or audibly presenting the dialog to the user(s). As yet another example, some implementations that generate reply content that includes interactive user interface elements that are based on user state information may increase the likelihood that such interactive elements are beneficial to one or more user(s) included in the dialog—and lessen the chance that computational resources are expended in association with irrelevant interactive elements. Additional or alternative technical advantages may be achieved, such as one or more described elsewhere in this specification.

In FIG. 1, an example environment in which techniques disclosed herein may be implemented is illustrated. The example environment includes one or more user interface input devices 102, one or more user interface output devices 104, one or more sensors 106, an automated assistant 120, a search system 130, one or more search database(s) 154, and one or more models 152.

The user interface input devices 102 may include, for example, a physical keyboard, a touch screen (e.g., implementing a virtual keyboard or other textual input mechanism), and/or a microphone. The user interface output devices 104 may include, for example, a display screen, and/or speaker(s). The sensor(s) 106 may include one or more sensors that are in addition to the user interface input devices 102 such as, for example, a camera, a heart rate sensor, a location sensor, a GPS sensor, an accelerometer, a gyroscope, a Wi-Fi chip, etc.

The user interface input device(s) 102, user interface output devices 104, and sensor(s) 106 may be incorporated on one or more computing devices of a user. For example, a mobile phone of the user may include the user interface input and output devices 102, 104 and include one or more of the sensors 106. Also, for example, a standalone personal assistant hardware device may include the user interface input and output devices 102, 104 and a separate computing device (e.g., in a watch form, or a mobile phone form) may include one or more of the sensors 106. As another example, a first computing device may include the user interface output device(s) 104, and a separate second computing device may include the user interface input device(s) 102. In that and/or other examples, sensor data from any other sensor(s) 106 of the first and second computing devices may optionally not be provided to the automated assistant 120 (e.g., sensor data from the user interface input device(s) 102 may be utilized to determine a user state).

Although automated assistant 120 is illustrated in FIG. 1 as separate from the sensor(s) 106 and separate from the user interface input and output devices 102, 104, in some implementations all or aspects of the automated assistant 120 may be implemented on a computing device that also contains the user interface input device(s) 102, the user interface output device(s) 104, and/or the sensor(s) 106. For example, all or aspects of user state engine 122 and/or reply content engine 126 of automated assistant 120 may be implemented on the computing device. In some situations where all or aspects of user state engine 122 are implemented on the computing device, synthesized versions of user state information may be determined by the computing device and provided to a remote automated assistant 120, which may enable prevention of certain more granular sensor signals from being transmitted by the computing device to the remote automated assistant 120. In some implementations, all or aspects of the automated assistant 120 may be implemented on computing device(s) that are separate and remote from a computing device that contains the user interface input device(s) 102, the user interface output device(s) 104, and/or the sensor(s) 106 (e.g., all or aspects may be implemented "in the cloud"). In some of those implementations, those aspects of automated assistant 120 may communicate with the computing device via one or more networks such as a local area network (LAN) and/or wide area network (WAN) (e.g., the Internet).

Some non-limiting examples of client computing device(s) that may include the user interface input device(s) 102, the user interface output device(s) 104, and/or the sensor(s) 106 include one or more of: a desktop computing device, a laptop computing device, a standalone hardware device at least in part dedicated to automated assistance, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device).

Additional and/or alternative client computing devices may be provided. In some implementations, a given user may communicate with all or aspects of automated assistant 120 utilizing a plurality of client computing devices that collectively form a coordinated "ecosystem" of computing devices. However, for the sake of brevity, some examples described in this disclosure will focus on the user operating a single client computing device. Also, in many implementations multiple users may communicate with all or aspects of automated assistant 120, and each user may utilize one or more of their computing devices to communicate with the automated assistant 120. For example, as described herein the automated assistant 120 may be involved in a dialog between multiple users and may communicate with client computing device(s) of one or more of those users.

A client computing device and automated assistant 120 may each (when they are separate devices) include one or more memories for storage of data and software applications, one or more processors for accessing data and executing applications, and other components that facilitate communication over a network. The operations performed by one or more of the client computing devices and/or by the automated assistant 120 may be distributed across multiple computing devices. Automated assistant 120 may be implemented as, for example, computer programs running on one or more computers in one or more locations that are coupled to each other through a network.

As illustrated in FIG. 1, a user provides input to the automated assistant 120 via the user interface input device(s) 102. The automated assistant 120 provides responsive output for presentation to the user and/or to additional user(s) via the user interface output devices(s) 104 (optionally after further processing by one or more components). For the sake of simplicity, the input is illustrated in FIG. 1 as being provided directly to the automated assistant 120 by the user interface input device(s) 102 and the output is illustrated as being provided by the automated assistant 120 directly to the user interface output device(s) 104. However, it is noted that in various implementations one or more intermediary hardware components may be functionally interposed between the automated assistant 120 and the user interface input and/or output devices 102, 104, and may optionally process the input and/or output. For example, one or more components may process the output provided by automated assistant 120 and generate, based on the processing of the output, one or more signals for presentation of reply content via the user interface output device(s) 104. For instance, where a user interface output device 104 is on a client computing device separate from all or aspects of the automated assistant 120, a hardware processor and/or other components may process the output and generate, based on the output, signals for driving the user interface output device 104.

In some implementations, the input received by the automated assistant 120 includes content that is already in a textual format (and optionally additional content that is not in a textual format, such as images). For example, the user interface input device(s) 102 may include a keyboard that generates textual input in response to user interface input directed to the keyboard, and the textual input provided to the automated assistant 120. Also, for example, the user interface input device(s) 102 may include a microphone, a voice-to-text processor that is separate from the automated assistant 120 may convert voice input received at the microphone into textual input, and the textual input may be provided to the automated assistant 120. In some other implementations, the input initially received by the automated assistant 120 is not in a textual format, but at least some of the input is converted to a textual format by the automated assistant 120 and provided in the textual format to one or more other components of the automated assistant 120. For instance, the user interface input device(s) 102 may include a microphone, voice input may be received at the microphone and provided to the automated assistant 120, and a voice-to-text processor of the automated assistant 120 may convert the voice input into textual input.

A client computing device may optionally operate one or more applications that enable dialog with the automated assistant 120. Such applications may come in various forms such as a short messaging service ("SMS") and/or multimedia messaging service ("MMS") client, an online chat client (e.g., instant messenger, Internet relay chat, or "IRC," etc.), a messaging application associated with a social network, an email client, a social blogging client, an automated assistant messaging service dedicated to conversations with automated assistant 120, and so forth. In some implementations, one or more of the applications may be implemented via a webpage or other resources rendered by a web browser or other application of a client computing device.

In various implementations, in response to textual input provided to the automated assistant 120 during a dialog that includes the automated assistant 120, the automated assistant 120 may generate responsive reply content based on the textual input and based on user state information. The automated assistant 120 may then provide, as output, the reply content for presentation (visual and/or audible) to one or more of the users involved in the dialog. In some implementations, the reply content is automatically included in the dialog by the automated assistant 120 as a reply, by the automated assistant 120, to the textual input. In some implementations, the reply content is suggested, by the automated assistant 120, for inclusion in the dialog and is only included in the dialog in response to further user interface input. In some versions of those implementations, the further user interface input is input of the user that provided the textual input and the inclusion of the reply content in the dialog is as a reply to the textual input by the automated assistant 120. In some other versions of those implementations, the further user interface input is input of an additional user involved in the dialog and the inclusion of the reply content in the dialog is as a reply to the textual input by the additional user involved in the dialog.

In various implementations, the automated assistant 120 may include a user state engine 122, a text generation engine 124, and a reply content engine 126. In some implementations, one or more of engines 122, 124, and/or 126 may be omitted, combined, and/or implemented in a component that is separate from automated assistant 120. For example, one or more of engines 122, 124, and/or 126, or any operative portion thereof, may be implemented in a component that is executed by a client computing device that includes the user interface input and/or output devices 102 and 104 and that is separate from the automated assistant 120.

The user state engine 122 determines user state information for one or more users involved in a dialog with the automated assistant 120. The user state engine 122 provides the user state information to text generation engine 124 and/or reply content engine 126 for use in generating reply content based on the user state information. In some implementations, the user state information that is provided and utilized to generate reply content may include one or more classes and/or magnitudes of user state. Various classes and/or magnitudes may be utilized. For example, classes that are indicative of happy, sad, neutral, active, tired, stressed, and/or other user state(s) may be utilized. In some of those and/or other implementations, the user state engine 122 may also determine a magnitude of one or more of the user states. For instance, the user state engine 122 may determine a weight of "0.8" for "happy", a weight of "0.7" for "active", and a weight of "0.0" for the other classes. Also, for example, more granular classes may additionally and/or alternatively be utilized such as slightly happy, medium happy, and very happy (e.g., in lieu of a general "happy" class).

In various implementations, the user state engine 122 determines class(es) and/or magnitude(s) of a user state based on applying one or more user state indicators to one or more trained classifier model(s) or other trained machine learning model(s). For example, one or more images of a user captured by a camera may be passed through a face detector and further through a facial expression classifier whose output indicates whether the facial expression is happy, tired, sad, and/or other class. The user state engine 122 may determine the user state information based at least in part on the output of the facial expression classifier.

In some implementations, the user state information that is provided by the user state engine 122 and utilized to generate reply content includes the "raw signals" from one or more sensor(s) and/or discretized versions of those "raw signals". For example, one or more images of the user captured by a camera may be provided by the user state engine 122 and applied by the reply content engine 126 as direct input to a neural network model or other machine learning model(s) that are utilized to determine one or more aspects of reply content to provide to a user. Also, for example, a typing speed of a user determined from sensor data associated with one of the user interface input device(s) may be provided by the user state engine 122 and applied by the reply content engine 126 as direct input to a neural network model or other machine learning model(s) that are utilized to determined one or more aspects of reply content to provide to a user.

In some implementations, the user state engine 122 determines user state information based on synthesizing multiple user state indicators. For example, the user state engine 122 may apply an image of a user captured by a camera to a first classifier trained to predict class(es) of user state based on images and may apply the heart rate sensor data to a second classifier trained to predict class(es) of user state based on heart rate sensor data. The user state engine 122 may consider the outputs of the two classifiers in determining the user state information. For example, the user state engine 122 may average the outputs to determine the user state information, use the greater magnitude output in determining the user state information, and/or otherwise consider and/or combine both outputs in determining the user state information. As another example, the user state engine 122 may apply both an image of a user captured by a camera and heart rate sensor data of the user as input to a neural network model trained to predict class(es) of user state based on both images and heart rate sensor data. The user state engine 122 may determine the user state information based on output generated over the neural network model based on the applied input.

In some implementations, the user state engine 122 determines user state information that is indicative of user state of multiple users involved in a dialog. The user state engine 122 may determine user state information that is indicative of the user states of both users utilizing various techniques. For example, the user state engine 122 may determine one or more classes and/or magnitudes of user state for a first user, determine one or more classes and/or magnitudes of user state for a second user, and determine the user state information based on the classes and/or magnitudes for both users. For example, the user state engine 122 may average the classes and magnitudes of the two users. For instance, assume the user state for the first user indicates a first class of "happy" with a magnitude of "0.8" and a second class of "stressed" with a magnitude of "0.2"; and that the user state for the second user indicates the first class of "happy" with a magnitude of "0.6" and the second class of "stressed" with a magnitude of "0.1". The user state engine 122 may determine an average of the classes that indicates the first class of "happy" with a magnitude of "0.7" and the second class of "stressed" with a magnitude of "0.1". Additional or alternative techniques of determining user state information that is indicative of the user states of multiple users may be utilized.

In some implementations, the user state engine 122 determines user state information for a given user based at least in part on one or more user state indicators that are in addition to textual input provided by the given user during a dialog that includes the automated assistant 120. In some of those implementations, the user state engine 122 may determine the user state information based on sensor data from one or more of the user interface input device(s) 102 used by the given user. For example, when the given user has provided typed input in a dialog (e.g., using a physical keyboard or virtual keyboard), the user state information may be determined based on a typing speed of the typed input, applied pressure for one or more characters of typed input (e.g., as sensed by a touch screen implementing a virtual keyboard), a "delay time" for starting to provide the typed input (e.g., when the typed input is provided responsive to other content), and/or other sensed features of the typed input. For instance, user state information that indicates the given user is stressed may be determined based on typing speed of the given user being fast and the pressure applied by the given user during the typing being high. A typing speed of "fast" and/or a pressure of "high" may be relative to one or more baselines such as a baseline that is specific to the given user (e.g., based on prior typed input of the user) and/or a baseline that is applicable to multiple users.

As another example, when the given user has provided voice input in a dialog (e.g., as sensed by a microphone), the user state information may be determined based on tone, inflection, intonation, accent, pitch, volume, breathing volume, breathing rate, background noise level, background noise type, and/or other features of the voice input. As another example, the user state engine 122 may determine user state information for the given user based on audio input from a microphone, even when the microphone isn't used by the given user to provide textual input. For example, the user state engine 122 may determine the user state information based on the presence and/or absence of certain types of sound (e.g., laughter, crying, music) in the audio input, background noise level in the audio input, breathing noise level in the audio input, breathing rate in the audio input, aspects of detected speech in the audio input (e.g., intonation, accent), etc.

In some implementations, the user state indicators that are in addition to textual input provided by the given user include sensor data from one or more of the sensor(s) 106 that are in addition to the user interface input and output devices 102, 104. In some of those implementations, the sensor(s) 106 may be part of the computing device utilized by the given user to provide textual input in the dialog and/or may be from another computing device. As one example, the user state engine 122 may determine user state information for the given user based on one or more images from a camera that is included in the sensor(s) 106. For example, the user state engine 122 may determine the user state information based on: user facial expression(s) in the image(s); user gesture(s) in the image(s); user speed of movement in the image(s); user gaze direction(s) in the image(s); environmental brightness in the image(s); background object(s) in the image(s); environmental color temperature in the image(s); and/or shape, wavelength, and/or other features of infrared radiation in the image(s) (e.g., when the camera is a thermographic camera). For instance, one or more images of the given user captured by a camera may be passed through a face detector to detect the face of the given user in the image, and the face of the given user in the image passed through a facial expression classifier whose output indicates whether the facial expression is happy, tired, sad, and/or other class of user state. The outputted class of user state may be utilized as the user state information, or used along with other user state indicators to determine the user state information.

As another example, the user state engine 122 may determine user state information for the given user based on sensor data indicating a user's heart rate. For example, the sensor data may be from a sensor 106 of a watch worn by the given user or other wearable computing device worn by the given user. As yet another example, the user state engine 122 may determine user state information based on location information determined based on a GPS sensor, a Wi-Fi chip (e.g., location information determined based on available network(s), IP address, and/or other sensor data from the Wi-Fi chip), and/or other sensor(s) 106. For instance, the user state engine 122 may determine the user state information based on whether the user is at home, at work, or at another location. As yet a further example, the user state engine 122 may determine user state information based on sensor data from an accelerometer and/or gyroscope. For instance, sensor data from an accelerometer and/or gyroscope may be utilized to determine a potential activity being engaged in by the given user, which may indicate the user state information.

In some implementations, the user state indicators that are in addition to textual input provided by the given user during a dialog include non-textual content provided by the given user in the dialog such as emojis, images, and/or other non-textual content. For example, certain emojis and/or images submitted by a user may be directly mapped to certain indications of user state information. Also, for example, the user state engine 122 may provide an image submitted by a user to an image analysis engine that recognizes object(s) in images, and one or more objects recognized in the image may be mapped to certain indicators of user state information.

In some implementations, in determining user state information for a given user, the user state engine 122 may also utilize one or more features of textual input provided by the given user in a dialog that includes the automated assistant 120. Features of the textual input may include, for example, particular term(s) included in the textual input, syntactic structure(s) of the textual input, and/or length of the textual input (word and/or character length). In some implementations, the user state engine 122 may apply one or more terms and/or other features of textual input to a sentiment classifier trained to predict class(es) and/or magnitude(s) of sentiment in textual segments and utilize the output from the sentiment classifier in determining the user state information. For example, the user state engine 122 may determine the user state information based on combining the output from the sentiment classifier with output(s) from other classifiers trained to predict user state information based on sensor data and/or other signals that are in addition to textual input itself.

Text generation engine 124 is optional and may be utilized to generate one or more initial textual outputs that are each responsive to received textual input. In some implementations, initial textual output that is generated by text generation engine 124 is provided to reply content engine 126 and reply content engine 126 generates reply content based on modifying the initial textual input in view of the user state information. For example, the reply content engine 126 may utilize one or more techniques, such as those described herein, to add term(s) to the initial textual output, remove term(s) from the initial textual output, and/or replace term(s) in the initial textual output, to thereby modify the initial textual output such that it is more tailored to the user state information than is the initial textual output. The text generation engine 124 may take various forms such as a machine learning model and/or human created heuristics. As one non-limiting example, the text generation engine 124 may utilize a recurrent neural network model that is trained to predict, based on feature(s) of textual input, an initial textual output that is responsive to the textual input. The recurrent neural network model may be trained, for example, based on a corpus of past textual inputs and responsive replies that occur between humans, such as in past chat sessions between humans.

The reply content engine 126 may generate and provide various types of reply content in response to textual input provided by a user. Moreover, various techniques may be utilized by the reply content engine 126 to determine the reply content based on both the textual input and user state information. For example, as referenced above, in some implementations the textual input is provided to the text generation engine 124, an initial textual output is received from the text generation engine 124, and the reply content engine 126 generates reply content based on modifying the initial textual input in view of the user state information. Also, for example, in some implementations, the reply content engine 126 utilizes the textual input to determine a plurality of candidate reply options (e.g., based on one or more of the model(s) 152 and/or based on multiple initial textual outputs provided by the text generation engine 124), uses the user state information to select one of those reply options, and generates the reply content based on the selected reply option. Also, for example, in some implementations, the reply content engine 126 causes the search system 130 to issue a search based on received textual input and user state information, receives search results that are based on the search, and generates the reply content based on one or more of the search results (e.g., one or more of the search results may be provided as all or part of the reply content).

Figure 2A:
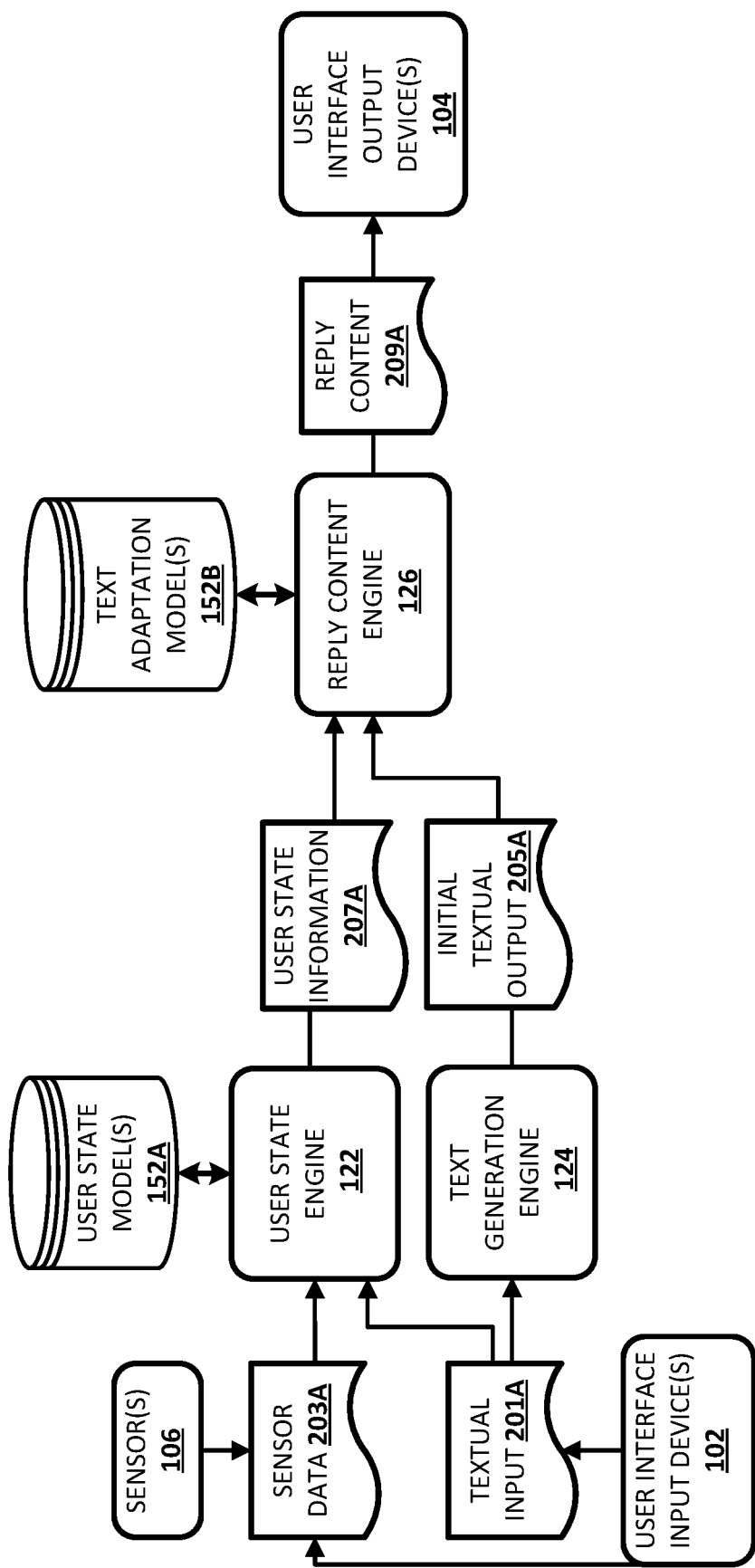
FIGS. 2A, 2B, and 2C each illustrate an example of using components of the example environment of FIG. 1 in generating reply content based on textual input and based on user state information.
Figure 2B:
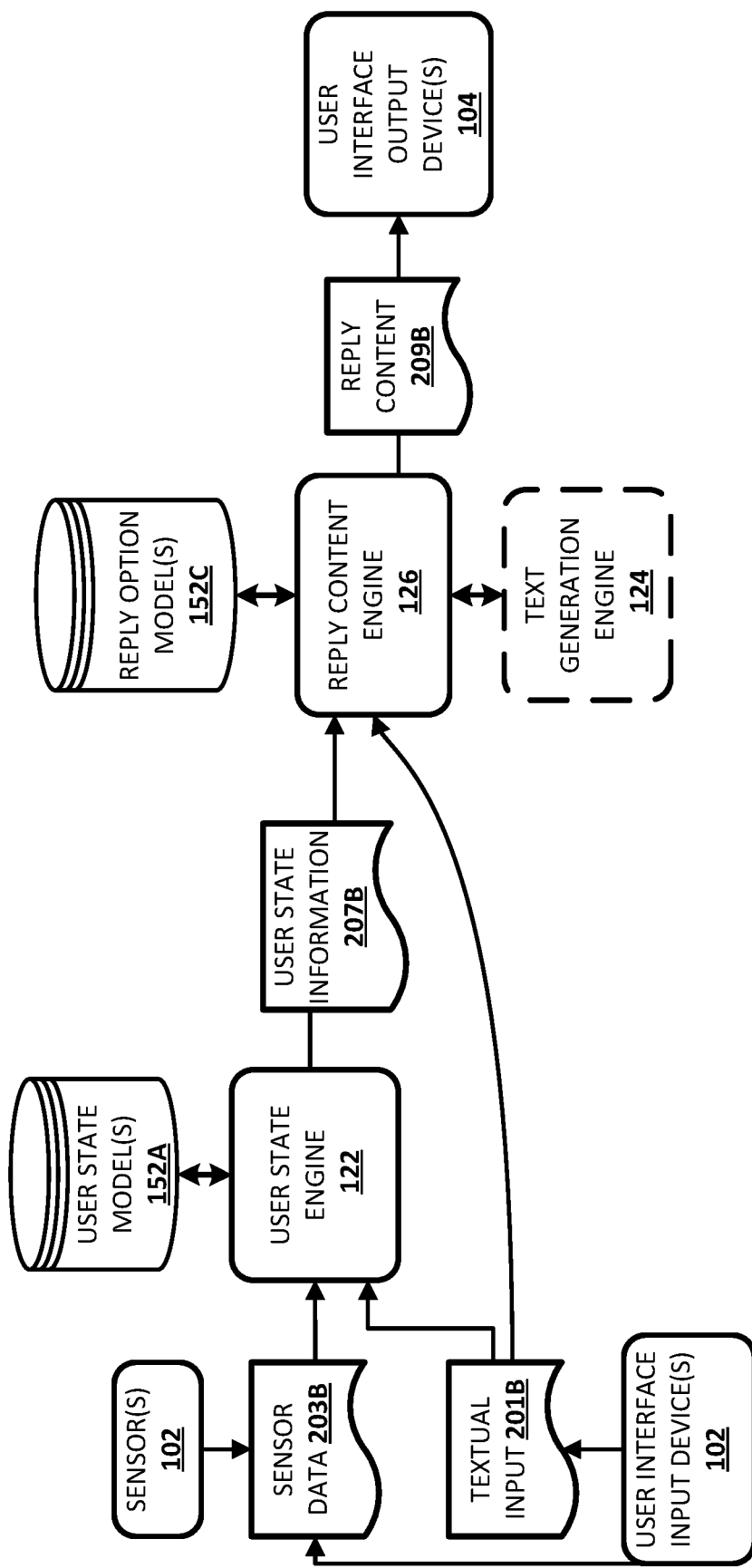
Figure 2C:
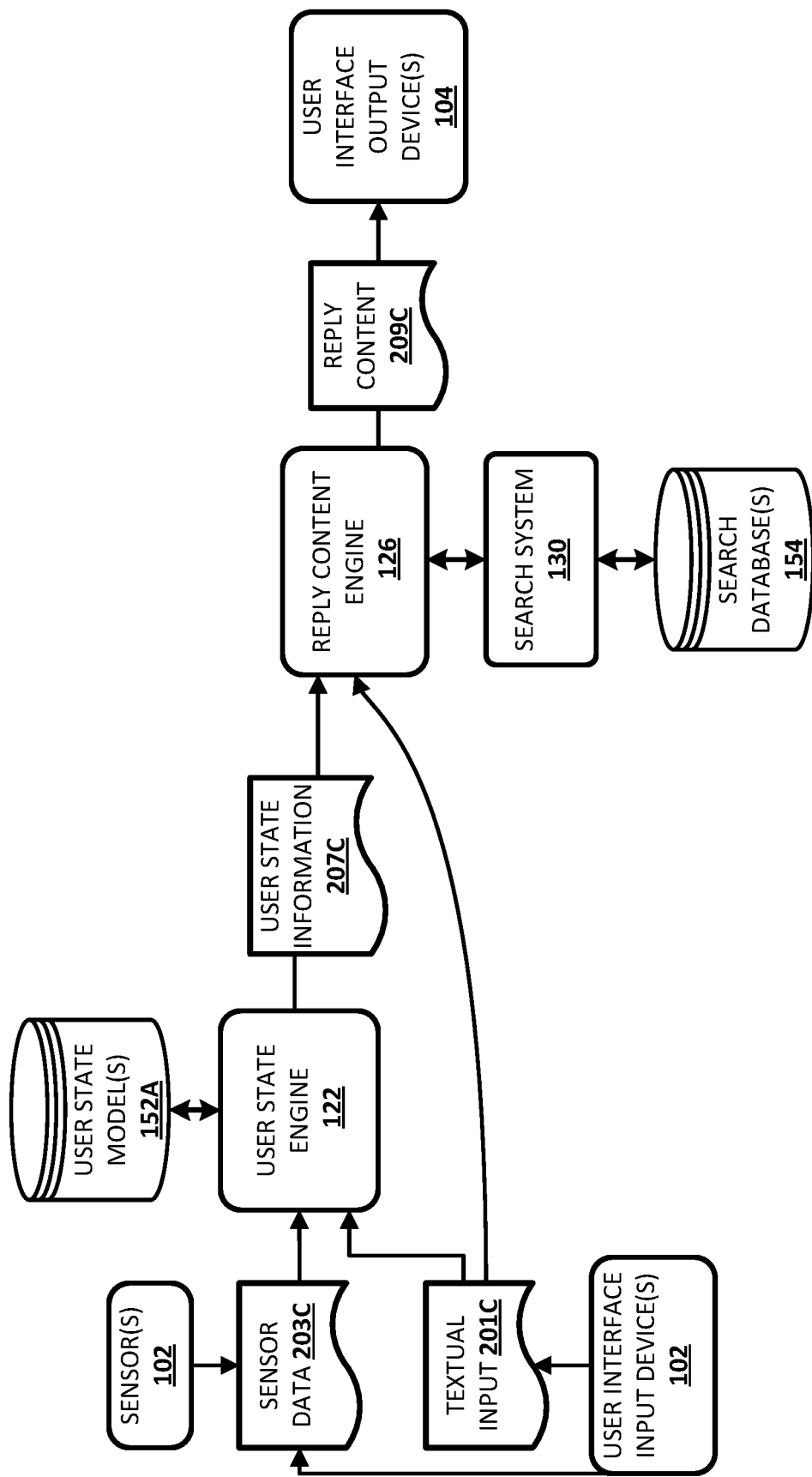

Referring now to FIGS. 2A-2C, additional description is provided of the components of FIG. 1 and of various examples of generating reply content based on textual input and based on user state information.

FIG. 2A illustrates an example of the text generation engine 124 generating initial textual output 205A and the reply content engine 126 generating reply content 209A by modifying the initial textual output 205A in view of user state information 207A. In FIG. 2A, textual input 201A that is based on user interface input generated by one or more user interface input device(s) 102 is provided to the text generation engine 124 as part of a dialog. The text generation engine 124 generates initial textual output 205A and provides the initial textual output 205A to reply content engine 126.

The user state engine 122 receives sensor data 203A and/or the textual input 201A and utilizes one or more user state models 152A (included in the models 152 of FIG. 1) to generate user state information 207A that indicates user state of the user that submitted the textual input 201A and/or of one or more additional users that are also involved in the dialog. The sensor data 203A may be based on sensor(s) of user interface input device(s) 102 and/or of sensor(s) 106 that are in addition to the user interface input device(s) 102.

As one specific example, the user state model(s) 152A may include a model that is trained to predict one or more classes of sentiment (and optionally magnitude(s)) based on image(s) of a user's face. The user state engine 122 may apply, as input to the model, one or more images, captured by a camera of sensor(s) 106, that each capture a user's face. The user state engine 122 may generate, over the model, output that indicates one or more classes (and optionally magnitudes) indicated by the user's face in the image(s). For instance, the user state engine 122 may generate an output that indicates a user is "happy". The user state model(s) 152A may further include a model that is trained to predict the presence of one or more types of sound in audio input. The user state engine 122 may apply, as input to the model, audio input captured by a microphone of the user interface input device(s) 102 (regardless of whether the microphone was utilized to generate the textual input 201A). The user state engine 122 may generate, over the model, output that indicates one or more types of sound that are present in the audio input. For instance, the user state engine 122 may generate an output that indicates laughter is present in the audio input. The user state model(s) 152A may further include a model that is trained to predict one or more classes of sentiment (and optionally magnitude(s)) based on feature(s) of textual input. The user state engine 122 may apply, as input to the model, feature(s) of the textual input 201A and may generate, over the model, output that indicates one or more classes (and optionally magnitudes) indicated by the textual input 201A. For instance, the user state engine 122 may generate an output that indicates the textual input 201A is "happy" textual input.

In some implementations, the user state engine 122 may optionally synthesize the three outputs from the three models and provide an indication of the synthesized output as user state information 207A. For example, the user state engine 122 may synthesize "happy", "laughter", and "happy" outputs to user state information that is indicative of a "happy" or "very happy" user state. In some implementations, the user state engine 122 may optionally provide an indication of the three separate outputs as the user state information 207A without synthesizing those outputs. Moreover, in some implementations, the user state engine 122 may optionally provide one or more raw or discretized signals as all or part of the user state information 207A in lieu of one or more of the three separate outputs (e.g., the user state information 207A may simply pass the signals without application of the signals to the user state model(s) 152A).

As another example, instead of or in addition to the three separate models mentioned above, the user state model(s) 152A may include a neural network model of other machine learning model that is trained to predict one or more classes of user state (and optionally magnitude(s)) based on multiple heterogeneous inputs. For example, the neural network model may be trained to predict one or more classes of user state based on input that includes: image(s) that each capture a user's face, audio input, and textual input. For instance, the user state engine 122 may apply, as input to the neural network model, image(s) from camera(s) of sensor(s) 106, audio input(s) from user interface input device(s) 102, and one or more features of the textual input 201A (and optionally prior textual input); and may generate, over the model, output that indicates a class of user state indicated by the inputs. Although particular inputs and models are described with reference to FIG. 2A, additional or alternative inputs and/or models may be utilized, such as those described elsewhere herein.

The reply content engine 126 uses the initial textual output 205A and the user state information 207A to generate reply content 209A. The reply content engine 126 provides the reply content 209A for presentation, to one or more users engaged in the dialog, via the user interface input device(s) 104 of those user(s). In some implementations, the reply content 209A is automatically included in the dialog as a reply to the textual input 201A by the automated assistant. In some implementations, the reply content 209A is suggested by the reply content engine 126 for inclusion in the dialog and is only included in the dialog in response to further user interface input. In some versions of those implementations, the further user interface input is input of the user that provided the textual input 201A and the inclusion of the reply content in the dialog is as a reply to the textual input 201A by the automated assistant. In some other versions of those implementations, the further user interface input is input of an additional user involved in the dialog and the inclusion of the reply content in the dialog is as a reply to the textual input by the other user involved in the dialog.

In some implementations, the reply content engine 126 generates the reply content 209A based on one or more text adaptation models 152B (included in the models 152 of FIG. 1). In some of those implementations, the reply content engine 126 applies one or more (e.g. all) segments of the initial textual output 205A as input to one of the text adaptation model(s) 152B, and generates, over the model based on the input, output that indicates content for modifying the initial textual output. The reply content 209A may include at least some of the content indicated by the output generated over the model and optionally one or more terms of the initial textual output 205A. For example, where term(s) are indicated by the output, the term(s) indicated by the output may include term(s) for adding to the initial textual output 205A and/or term(s) for replacing term(s) of the initial textual output 205A—and the reply content engine 126 may modify the initial textual output 205A by adding and/or replacing terms as indicated by the output. As another example, terms indicated by the output may be the reply content to be provided (i.e., the output may indicate the initial textual output 205A as modified by the user state information 207A).

As one example of a model of text adaptation model(s) 152B, the model may include mappings (data defining an association) of neutral textual segments to segments that are each specific to a user state. In some implementations, a given model may be for a specific user state indicated (explicitly or implicitly) by the user state information 207A. For example, a "jovial" model may map neutral textual segments to segments that are each more appropriate for a jovial user state (e.g., neutral segment "hi" to more jovial segments "howdy, ;-)" and/or "helllooooo"). In some of those implementations, the given model for the specific user state indicated by the user state information 207A may be selected based on the given model being assigned a model identifier that indicates the specific user state. In some implementations, a given model may be inclusive of multiple user states, instead of being for a specific user state. For example, a model may map a neutral segment to segment(s) that are each more appropriate for a jovial user state, to segment(s) that are each more appropriate for a stressed user state, and to segment(s) that are each more appropriate for a sad user state. In some of those implementations, the user state specific segments may each be mapped to corresponding user state identifiers and an appropriate user state specific segment selected by the reply content engine 126 based on its user state identifier corresponding to a specific user state indicated by the user state information 207A.

A segment that is specific to a user state and that is mapped to a corresponding neutral segment may include various content that differs from the neutral segment. For example, the segment that is specific to the user state may include one or more terms that are in addition to terms of the neutral segment, term(s) that replace term(s) of the neutral segment, may omit term(s) that are included in the neutral segment, and/or may include emojis, GIFs, and/or other non-textual content that is not included in the neutral segment. A segment that is specific to a user state and that is mapped to a corresponding neutral segment may additionally and/or alternatively include various style features that differ from those of the neutral segment. Style features include, for example, font size, font type (e.g., Calibri, Times New Roman), and/or font color. Where reply content 209A is additionally or alternatively to be provided as audible output, style features may additionally and/or alternatively include volume for providing the reply content 209A, a tone for providing the reply content 209A, a pitch for providing the reply content 209A, and/or a voice (e.g., male/female, female 1/female 2/female 3) for providing the reply content 209A.

In some implementations, a model that maps neutral segments to user state specific segments may be generated by analyzing a corpus of multi-user chat dialogs and/or other communications. For example, to generate mappings between neutral segments and "happy" segments, reply segments of the communications may be analyzed (e.g., using a sentiment classifier) to identify the reply segments that are "happy". Those reply segments could then be processed to remove particular keywords, symbols, tense of the sentence, and/or other features such that there is no sentiment expressed anymore (i.e., to obtain a neutral segment). The neutral segments may then be mapped to their corresponding original/happy reply segments.

As another example of a model of text adaptation model(s) 152B, the model may include one or more mappings of additional non-textual content that correspond to various user states, and the reply content engine 126 may generate the reply content 209A by adding the additional non-textual content to the initial textual output 205A. For example, the text adaptation model(s) 152B may include one or more emojis, GIFs, and/or other images that are each assigned to one or more user state identifiers that corresponds to one or more user states. The reply content engine 126 may select one or more of the emojis, GIFs, and/or other images to add to the initial textual output 205A based on the selected content being assigned to a user state identifier that corresponds to the user state information 207A. The initial textual output 205A with the added non-textual content may then be provided as the reply content 209A.

As another example of a model of text adaptation model(s) 152B, the model may be a neural network model that can be utilized to transform a textual segment into a user state specific version of the textual segment. In some implementations, the neural network model may be trained for a specific user state and may be selected based on that user state corresponding to the user state information 207A. In some implementations, the neural network model may be trained for multiple user states and the user state information 207A may be applied as input over the model (e.g., as side input along with the initial textual input). For example, the initial textual output 205A and the user state information 207A may both be applied as input to the model (optionally at different layers of the model) and a modified textual segment generated as output over the model, where the modified textual segment is specific to the user state information 207A. As described herein, the user state information 207A that is applied to the model may be in various forms such as a "synthesized" form or as parameterized sensor data.

In some implementations, a neural network model that can be utilized to transform a textual segment into a user state specific version of the textual segment may be trained based on training examples that each include: training example input based on a corresponding neutral text segment and corresponding user state information, and training example output based on a corresponding modified text segment that is a modification of the corresponding neutral text segment in view of the corresponding user state information. The neural network model may be trained by applying the training example inputs to the neural network model and performing backpropagation on the neural network model based on the training example outputs.

FIG. 2B illustrates an example of the reply content engine 126 generating reply content 209B by utilizing user state information 207B to select from multiple reply options. The multiple reply options may be identified based on one or more reply option models 152C (included in the models 152 of FIG. 1) and/or based on output from text generation engine 124. In FIG. 2B, textual input 201B that is based on user interface input generated by one or more user interface input device(s) 102 is provided to reply content engine 126 as part of a dialog.

The user state engine 122 receives sensor data 203B and/or the textual input 201B. In some implementations, the user state engine 122 utilizes one or more user state models 152A to generate user state information 207B that indicates user state of the user that submitted the textual input 201B and/or of one or more additional users that are also involved in the dialog. The sensor data 203B may be based on sensor(s) of user interface input device(s) and/or of sensor(s) 106 that are in addition to the user interface input device(s) 102. The user state engine 122 may utilize various techniques to generate the user state information 207B, such as one or more techniques described with respect to FIG. 1, FIG. 2A, and/or elsewhere herein. The user state information 207B may take various forms such as those described herein.

In FIG. 2B, the reply content engine 126 utilizes the textual input 201B to determine a plurality of candidate reply options, utilizes the user state information 207B to select one or more of those options, and generates the reply content 209B based on the selected reply option(s).

In some implementations, the reply content engine 126 provides the textual input 201B to text generation engine 124, text generation engine 124 provides multiple explicit reply options, reply content engine 126 selects one of those reply options based on the user state information 207B, and uses the selected option to generate the reply content 209B (e.g., the reply content 209B may conform strictly to the selected option). As one example, based on textual input 201B, the text generation engine 124 may identify multiple explicit reply option outputs for further dialog such as "how can I help you?" and "hope you are having a good day, how can I help?". The reply content engine 126 may select one of those options based on the selected option conforming to the user state information 207B more closely than the non-selected option(s). In some of those implementations, the reply content engine 126 may pass each of the multiple reply options through a sentiment classifier (e.g., of user state model(s) 152A) and compare outputs from the classifier to the user state information to select one of the reply options. For example, assume user state information 207B is indicative of a "happy" user state, that output from the sentiment classifier for a first reply option indicates a "happy" user state, and that output from the sentiment classifier for a second reply option indicates a "neutral" user state. In such a situation, the reply content engine 126 may select the first reply option based on it and the user state information 207B both indicating a "happy" user state.

In some implementations, a selected reply option may conform to the user state information 207B even when the selected reply option and the user state information are not associated with the same user state. For example, assume user state information 207B is indicative of a "sad" user state, that output from the sentiment classifier for a first reply option indicates a "sad" user state, and that output from the sentiment classifier for a second reply option indicates an "empathetic" user state. In some of those situations, the reply content engine 126 may select the second reply option based on an "empathetic" reply being more appropriate for a "sad" user state than is a "sad" reply. The reply content engine 126 may optionally rely on one or more mappings between user states indicated by user state information 207B and user states indicated by reply options in selecting a reply option. For instance, for a "sad" user state the mappings may define that "empathetic" reply options are most appropriate, followed by "neutral" reply options, etc.

In some implementations, the reply content engine 126 additionally or alternatively identifies multiple reply option categories from reply option model(s) 152C based on the textual input 201B. The reply content engine 126 may then select one of those reply option categories based on the user state information 207B. For example, the textual input 201B may be mapped to multiple reply option categories in reply option model(s) 152C, such as reply option categories of "tell a joke", "ask a question", "divert the user to a human", "divert the user to another chat bot", etc. In some implementations, the reply content engine 126 may utilize a rules-based approach to select from the multiple reply option categories based on user state information 207B. For example, a "divert the user to a human" reply option category may be assigned to a user state identifier that causes it to be selected when the user state information 207B indicates a certain type and/or magnitude of user state (e.g., "very upset"). Also, for example, when selecting between a "tell a joke" and "ask a question" reply option categories, the rules-based approach may cause the "tell a joke" reply option category to be selected for certain user states and the "ask a question" category to be selected for certain other user states.

In some implementations, the reply option model(s) 152C may additionally or alternatively include machine learning model(s) trained to select an appropriate reply option based on user state information. For example, a machine learning model may be trained to select a reply option category based on training examples generated based on past dialogs with the automated assistant 120 and/or other automated assistants. Each of the training examples may include, as training example input, user state information for a corresponding textual input and, as training example output, the corresponding reply option category for the corresponding textual input. Each of the training examples may be labeled as a positive or negative training examples (and/or weighted) based on various signals, such as length of further textual input (e.g., if the further textual input is longer than normal it may indicate a positive/desired reply option), whether further textual input was received (e.g., if the conversation was abandoned it may indicate a negative/undesired reply option), explicit user feedback, etc.

FIG. 2C illustrates an example of the reply content engine 126 causing a search to be issued based on textual input 201C and based on user state information 207C. The reply content engine 126 receives search result(s) based on the search, and generates reply content 209C that is based on one or more of the received search results. In FIG. 2C, textual input 201C that is based on user interface input generated by one or more user interface input device(s) 102 is provided to reply content engine 126 as part of a dialog.

The user state engine 122 receives sensor data 203C and/or the textual input 201C and utilizes one or more user state models 152A to generate user state information 207C that indicates user state of the user that submitted the textual input 201C and/or of one or more additional users that are also involved in the dialog. The sensor data 203C may be based on sensor(s) of user interface input device(s) and/or of sensor(s) 106 that are in addition to the user interface input device(s) 102. The user state engine 122 may utilize various techniques to generate the user state information 207C, such as one or more techniques described with respect to FIG. 1, FIG. 2A, and/or elsewhere herein. The user state information 207C may take various forms such as those described herein.

In FIG. 2C, the reply content engine 126 causes a search to be issued based on textual input 201C and user state information 207C. In particular, the reply content engine 126 causes the search system 130 to issue a search of search databases 154 based on one or more search parameters determined based on the textual input 201C and based on one or more search parameters determined based on the user state information 207C. In some of those implementations, one or more of the parameters may individually be based on both the textual input 201C and the user state information 207C. The search system 130 returns responsive search result(s) and the reply content engine 126 selects one or more of the search results for including (in whole or in part) in reply content 209C.

Determining search parameters based on the user state information 207C may include selecting, based on the user state information 207C, one or more terms and/or other parameters used for identifying content in the search and/or submitting the search with an indication of the user state information 207C for ranking one or more of the search results based on the user state information 207C. For example, for received textual input of "I'm bored" with a user state indicative of "stressed", a search may be issued for "relaxing activities nearby", where "relaxing" is chosen based on the "stressed" user state. Also, for example, for received textual input of "I'm hungry" with a user state indicative of "stressed", a search for "restaurants nearby" may be issued and the search results ranked based at least in part on whether they have a "relaxing" or similar attribute. For instance, search results that do not have a "relaxing" attribute may be filtered out of the search results.

The search system 130 searches one or more search databases 154 to identify content that is responsive to the search parameters provided by the reply content engine 126. In some implementations, the search databases 154 include database(s) that index publicly available content and/or database(s) that index content that is private to the user. The search system 130 may utilize the search databases 154 to identify responsive content and may generate search results based on the identified responsive content. In some implementations, one or more of the search databases 154 may be remote from the automated assistant 120 and/or any separate client computing device(s), and/or one or more of the search databases 154 may be local to the automated assistant 120 and/or any separate client computing device(s). In this specification, the term "database" is used to refer to any collection of structured or unstructured data stored in one or more computer readable media.

The search system 130 may utilize various techniques in searching the search databases 154 in response to textual input. In some implementations, the search system 130 may search one or more of the search databases 154 based on search parameter(s) that conform strictly to the textual input 201C and optionally based on search parameter(s) that are added based on the user state information 207C. In some implementations, the search system 130 may search one or more of the search databases 154 based on one or more search parameters that are based on, but that do not necessarily conform strictly to, the textual input 201C. For example, for textual input of "restaurants nearby", the search system 130 may search one or more of the search databases 154 based on a search parameter that restricts the search databases 154 to "points of interests" databases and/or content to "restaurant" content, and based on a search parameter that restricts content to content that is within a threshold distance of a current location of the user. As yet another example, for textual input of "my photos", the search system 130 may search one or more of the search databases 154 based on a search parameter that restricts the search databases 154 to databases that are personal to the user and/or content to "image" content.

The search system 130 may include a ranking engine that ranks identified content using one or more ranking signals, such as popularity of the content, a degree of matching between the search parameters and the content, attributes of the user (e.g., a location of the user, a primary language of the user), and/or based on search attributes that are based on the user state information 207C. Ranking the identified content may include calculating scores or other measures for the identified content and using those measures to indicate which content items to utilize as search results included in reply content 209C. As one example, the search system 130 may filter out or otherwise demote one or more content items based on determining those content items don't conform to the user state information 207C. As another example, the search system 130 may select or otherwise promote one or more content items based on determining those content items conform to the user state information 207C.

The search system 130 uses the identified responsive content ranked by the ranking engine to generate search results. The search results include search results corresponding to the content that is responsive to the search issued based on the textual input. For example, each of the search results can include a title or other synopsis of a responsive content item, a summary of the content item, a link to the responsive content item, other information related to the responsive content item, and/or even the entirety of the content item. As one example, the summary of a news story content item may include a particular "snippet" or section of the news story. Also, for example, for a search result associated with an image, the search result may include a reduced size display of the image, a title associated with the image, and/or a link to the image. Also, for example, for a search result associated with a video, the search result may include an image from the video, a segment of the video, a title of the video, and/or a link to the video.

Although the search system 130 is illustrated as separate from the automated assistant 120 in FIG. 1, in some implementations one or more aspects of the search system 130 may be incorporated in the automated assistant 120. For example, all or aspects of the ranking engine of the search system 130 (e.g., at least the aspect that ranks search results based on user state information) may be incorporated in whole or in part by the automated assistant 120.

Referring now to FIGS. 3A-9, various examples of implementations of the automated assistant 120 are described. FIGS. 3A, 3B, 4A, 4B, and 6-9 each illustrate a computing device 110 with a display screen 140 displaying graphical user interfaces with examples of dialog that may occur between a user of the computing device 110, the automated assistant 120, and/or one or more additional users according to implementations disclosed herein. One or more aspects of the automated assistant 120 may be implemented on the computing device 110 and/or on one or more computing devices that are in network communication with the computing device 110.

The display screen 140 of FIGS. 3A, 3B, 4A, 4B, and 6-9 further includes a textual reply interface element 188 that the user may select to generate user interface input via a virtual keyboard and a voice reply interface element 189 that the user may select to generate user interface input via a microphone. In some implementations, the user may generate user interface input via the microphone without selection of the voice reply interface element 189. For example, during the dialog, active monitoring for audible user interface input via the microphone may occur to obviate the need for the user to select the voice reply interface element 189. In some of those and/or in other implementations, the voice reply interface element 189 may be omitted. Moreover, in some implementations, the textual reply interface element 188 may additionally and/or alternatively be omitted (e.g., the user may only provide audible user interface input). The display screen 140 of FIGS. 3A, 3B, 4A, 4B, and 6-9 also includes system interface elements 181, 182, 183 that may be interacted with by the user to cause the computing device 110 to perform one or more actions.

Figure 5:
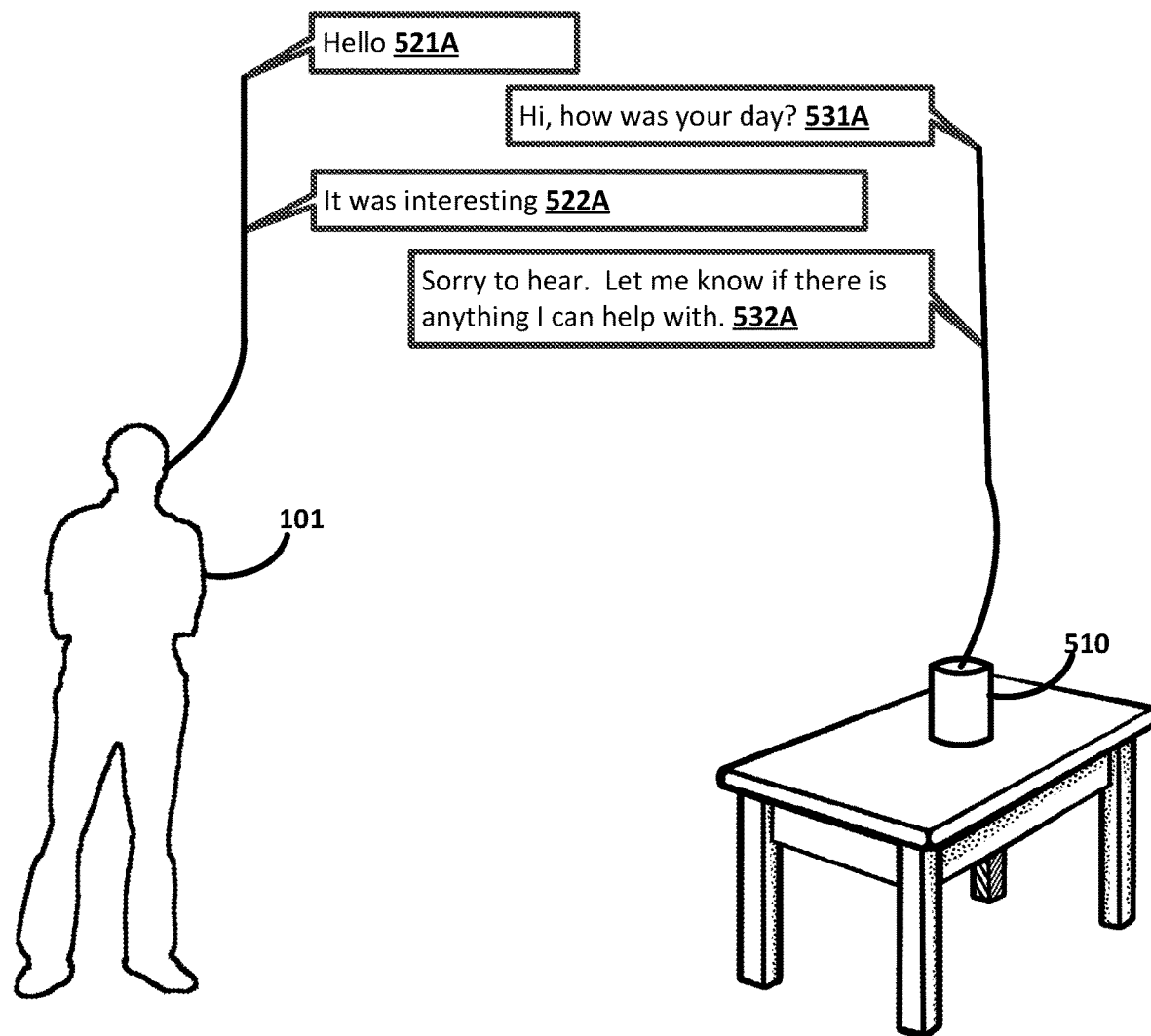
FIG. 5 illustrates another example client computing device, and an example of audible dialog that may occur between a user of the client computing device and an automated assistant according to implementations disclosed herein.

FIG. 5 illustrates a computing device 110 that includes one or more microphones and one or more speakers and illustrates examples of dialog that may occur, via the microphone(s) and speaker(s), between a user 101 of the computing device 510 and the automated assistant 120 according to implementations described herein. One or more aspects of the automated assistant 120 may be implemented on the computing device 510 and/or on one or more computing devices that are in network communication with the computing device 510.

Figure 3A:
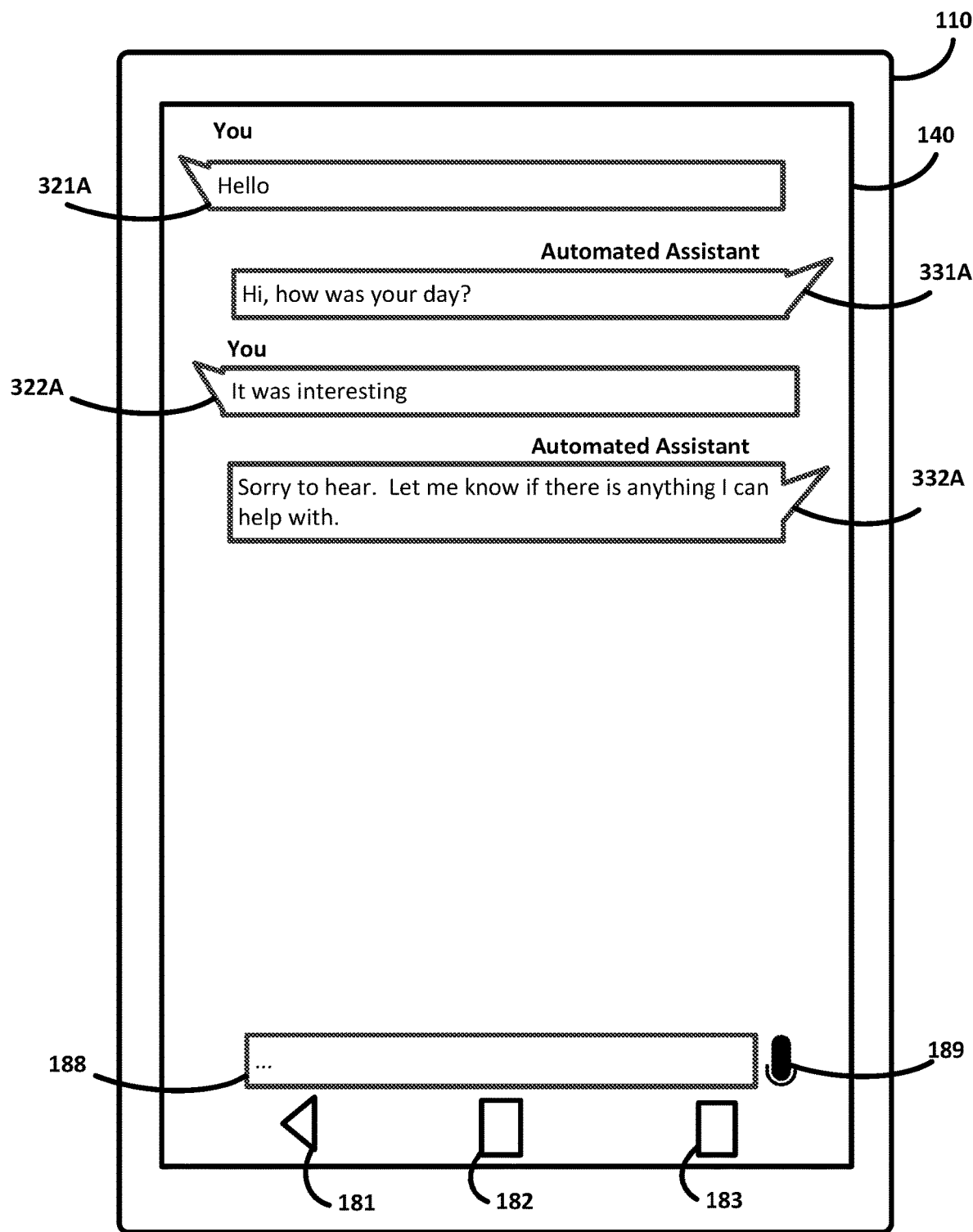
FIG. 3A illustrates an example client computing device with a display screen displaying an example of dialog that may occur between a user of the client computing device and an automated assistant according to user state information of the user.

In FIG. 3A, the user provides textual input 321A as part of a dialog between the user and the automated assistant 120. The automated assistant 120 determines user state information for the user and provides a reply 331A that is based on the textual input 321A and the user state information. For example, the user state information may be indicative of the user being "sad" and the reply 331A may be generated based on modifying initial textual output in view of that user state information. For instance, the text generation engine 124 may generate initial textual output of "Hi, tell me about your day", and, based on the user state information, the reply content engine 126 may replace "tell me about" with "how was".

The user provides textual input 322A in furtherance of the dialog. The automated assistant 120 provides a reply 332A that is based on the previously determined user state information for the user and/or based on updated user state information (e.g., determined based at least in part on the textual input 322A and/or sensor data received after the providing of the textual input 321A). The automated assistant 120 generates the reply 332A based on the textual input 322A (and optionally based on prior textual inputs 321A and/or 331A) and based on the user state information. For example, the user state information may still be indicative of the user being "sad" and the reply 332A may be generated based on modifying initial textual output in view of that user state information. For instance, the text generation engine 124 may generate initial textual output of "Nice to hear. Anything I can help with?", and, based on the user state information, the reply content engine 126 may replace "Nice" with "Sorry" and add "Let me know if there is" before "anything".

Figure 3B:
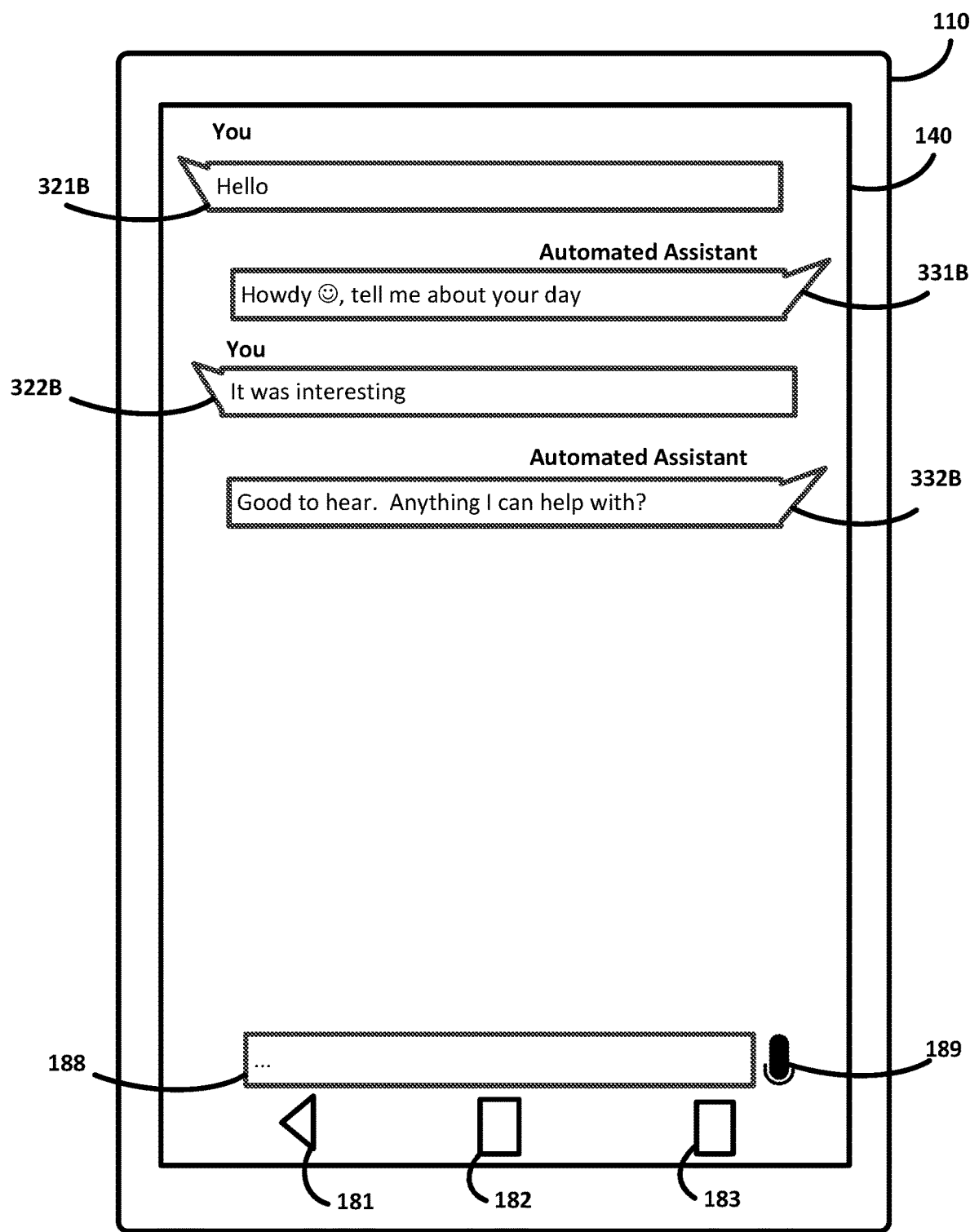
FIG. 3B illustrates an example of how the dialog of FIG. 3A may differ according to user state information of the user that differs from that of FIG. 3A.

FIG. 3B illustrates an example of how the dialog of FIG. 3A may differ according to user state information of the user that differs from that of FIG. 3A. In FIG. 3B, the textual input 321B is the same as textual input 321A of FIG. 3A and the textual input 322B is the same as textual input 322A of FIG. 3A. However, replies 331B and 332B differ based on different user state information being determined for the user. For example, in FIG. 3B the user state information may be indicative of the user being "happy". The replies 331B and 332B may be generated based on modifying initial textual outputs in view of that user state information. For instance, for reply 331B the text generation engine 124 may generate initial textual output of "Hi, tell me about your day", and, based on the user state information, the reply content engine 126 may replace "Hi" with "howdy" and add the smiley face emoji. Also, for instance, for reply 332B the text generation engine 124 may generate initial textual output of "Nice to hear. Anything I can help with?", and, based on the user state information, the reply content engine 126 may replace "Nice" with "Good".

Figure 4A:
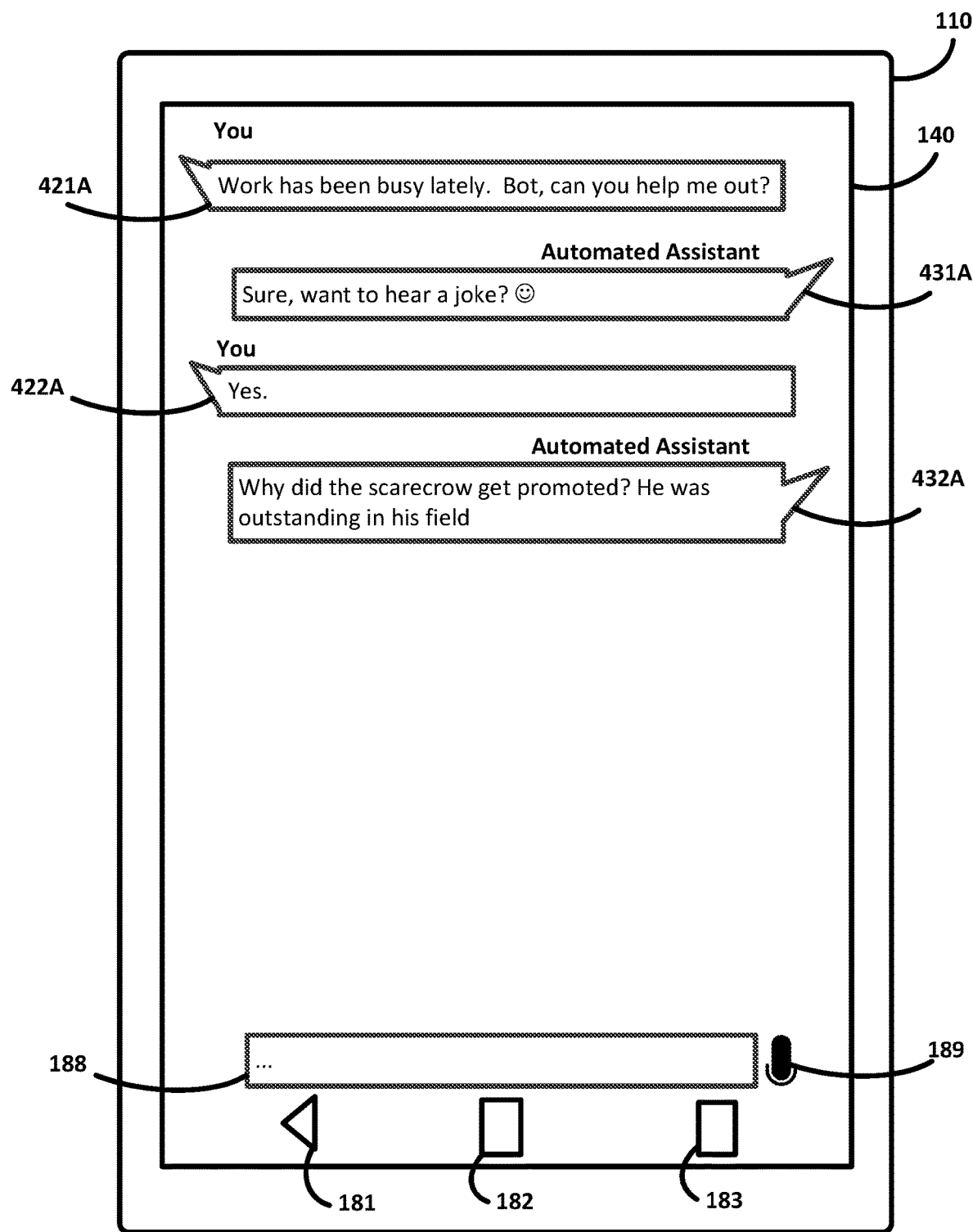
FIG. 4A illustrates the example client computing device of FIG. 3A, displaying another example of dialog that may occur between a user of the client computing device and the automated assistant according to user state information of the user.

In FIG. 4A, the user provides textual input 421A as part of a dialog between the user and the automated assistant 120. The automated assistant 120 determines user state information for the user and provides a reply 431A that is based on the textual input 421A and the user state information. For example, the user state information may be indicative of the user being "jovial" and the reply 431A may be generated based on identifying multiple reply options, and selecting one of the reply options in view of that user state information. For instance, the reply content engine 126 may identify at least a "tell a joke" option and a "provide information on time management" option based on the textual input 421A and may select the "tell the joke" option based on the "jovial" user state information. For example, the "tell the joke" option may be assigned to a jovial user state identifier in one or more reply option models. The user provides affirmative textual input 422A in furtherance of the dialog and the automated assistant 120 provides a reply 432A. The reply is a joke that is selected from a corpus of jokes based on the reply content engine 126 selecting of the "tell the joke" option.

Figure 4B:
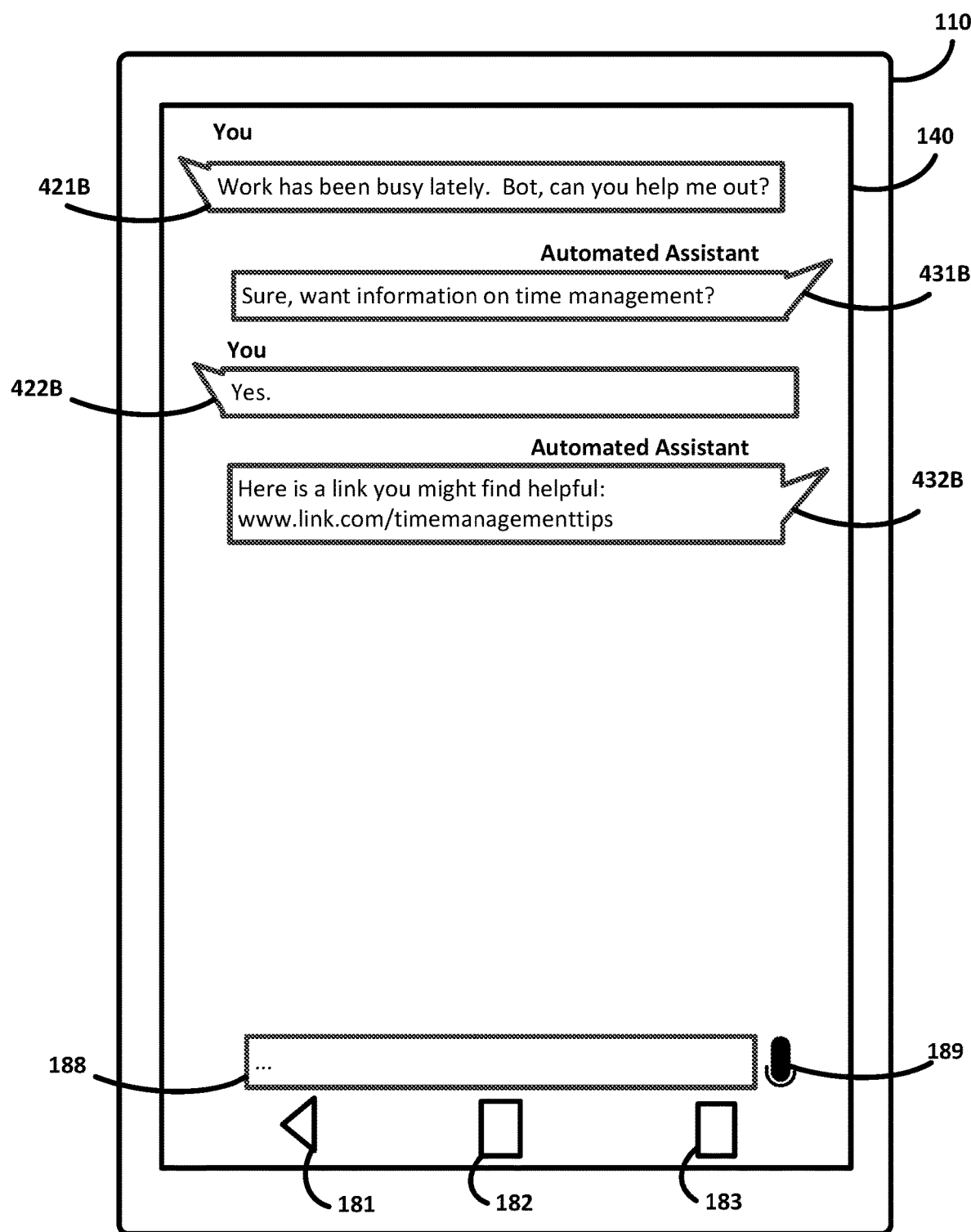
FIG. 4B illustrates an example of how the dialog of FIG. 4A may differ according to user state information of the user that differs from that of FIG. 4A.

FIG. 4B illustrates an example of how the dialog of FIG. 4A may differ according to user state information of the user that differs from that of FIG. 4A. In FIG. 4B, the textual input 421B is the same as textual input 421A of FIG. 4A and the textual input 422B is the same as textual input 422A of FIG. 4A. However, replies 431B and 432B differ from the replies 431A and 432A of FIG. 4A, and differ based on different user state information being determined for the user. For example, in FIG. 4B the user state information may be indicative of the user being "stressed". The reply 431B may be generated based on the reply content engine 126 identifying that a "provide information on time management" reply option conforms to the user state information. The reply content engine 126 may further provide the reply 432B based on the affirmative textual input 422B and based on selection of the "provide information on time management reply option".

In FIG. 5, the textual inputs 521A and 522A are the same as the textual inputs 321A and 321B of FIG. 3A. Moreover, the replies 531A and 532A provided by the automated assistant 120 are the same as the replies 331A and 332A of FIG. 3A. In FIG. 5, the textual inputs 521A and 522A are provided audibly by the user to the computing device 510 via microphone(s) of the computing device 510 and the computing device provides the replies 531A and 532A for audible presentation via speaker(s) of the computing device 510. In some implementations, the replies 531A and 532A may be generated in a similar manner as that described with respect to the replies 331A and 332A of FIG. 3A. In some implementations, the audible presentation of the replies 531A and 532A may optionally be based on one or more audible style features determined based on the user state information. For example, based on the user state information indicating the user is "jovial", the audible tone and/or other audible feature used in providing the audible replies 531A and 532A may be more "jovial" than if, for example, the user state information indicated the user was "sad".

Figure 6:
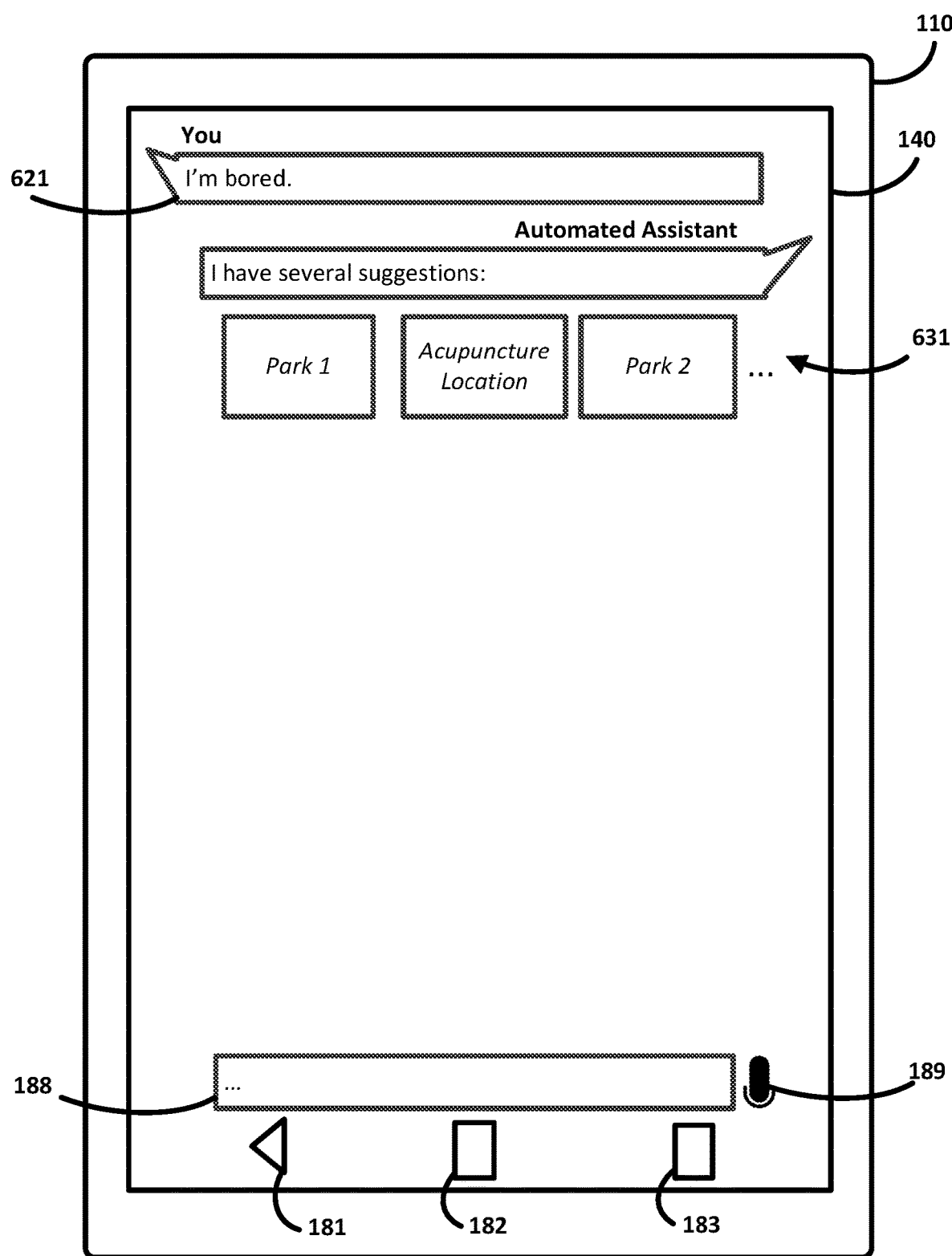
FIGS. 6 and 7 illustrate the example client computing device of FIG. 3A, displaying yet further examples of dialog that may occur between a user of the client computing device and the automated assistant according to user state information of the user.

In FIG. 6, the user provides textual input 621 as part of a dialog between the user and the automated assistant 120. The automated assistant 120 determines user state information for the user and provides a reply 631 that is based on the textual input 621 and the user state information. For example, the user state information may be indicative of the user being "stressed" and the reply 631 may be generated based on issuing a search that includes one or more search parameters that are based on the textual input 621 and that includes one or more search parameters that are based on that user state information. For example, the reply content engine 126 may cause the search system 130 to issue a search for "relaxing activities nearby", where "relaxing" is chosen based on the "stressed" user state and/or may cause the search system 130 to rank the search results based at least in part on whether they have a "relaxing" or similar attribute. For instance, search results that do not have a "relaxing" attribute may be filtered out of the search results. The reply 631 includes three of the search results identified in response to the search. Each of the search results relates to a "relaxing" location. Selection of one of the search results by the user may cause additional information about the corresponding location to be presented to the user. In some implementations, the additional information may be presented as a continuation of the ongoing dialog (e.g., added in the graphical user interface of FIG. 6 to the transcript of the dialog as further output from the automated assistant 120). In some other implementations, selection of one of the search results may cause the additional information to be presented to the user in a separate application and/or interface. For example, selection of one of the search results may cause a separate application to navigate to a link associated with the search result.

Figure 7:
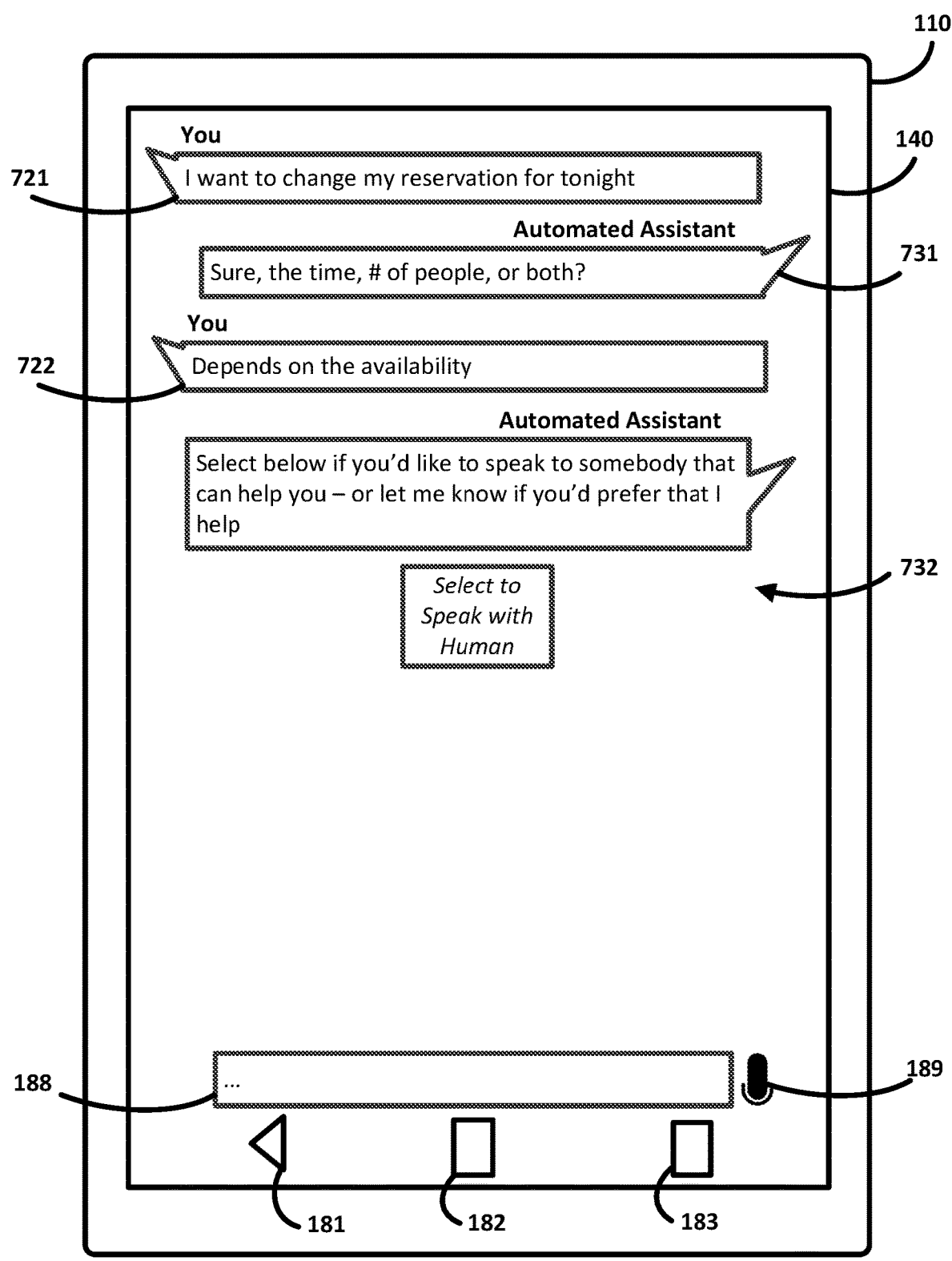

In FIG. 7, the user provides textual input 721 as part of the dialog with the automated assistant 120 and the automated assistant 120 provides a reply 731 that is responsive to the textual input 721. In some implementations, the reply 731 may not be determined based on user state information of the user. The user then provides textual input 722 as a continuation of the dialog and in response to the reply 731. The automated assistant 120 may determine that the user state information of the user during or before providing the textual input 722 is indicative of the user being "frustrated", "angry", and/or "stressed". In response to such a determination, the automated assistant 120 may provide the user with a reply 732 that includes an interactive element that can be selected to speak with a human. In some implementations, the interactive element may be provided in response to determining such user state information and in response to determining that such user state information indicates at least a threshold degree of change (in direction and/or magnitude) from prior (e.g., immediately prior) user state information of the user. Compare this to a situation where the user state information of the user during or before providing the textual input 722 is indicative of the user being "neutral" or "happy". In some of those implementations, the reply 732 may instead be tailored to helping the user resolve the request of textual input 721 without presenting the option to speak with a human.

Selection of the "Select to Speak with Human" interactive element may cause a network connection to be established between the computing device 110 and an additional computing device of a human operator, and further communication to occur between the user and the human operator via the network connection. In some implementations, the further communication may be via the graphical user interface of FIG. 7. In some other implementations, selection of the interactive element may cause a separate application and/or interface to be utilized for the further communication.

Figure 8:
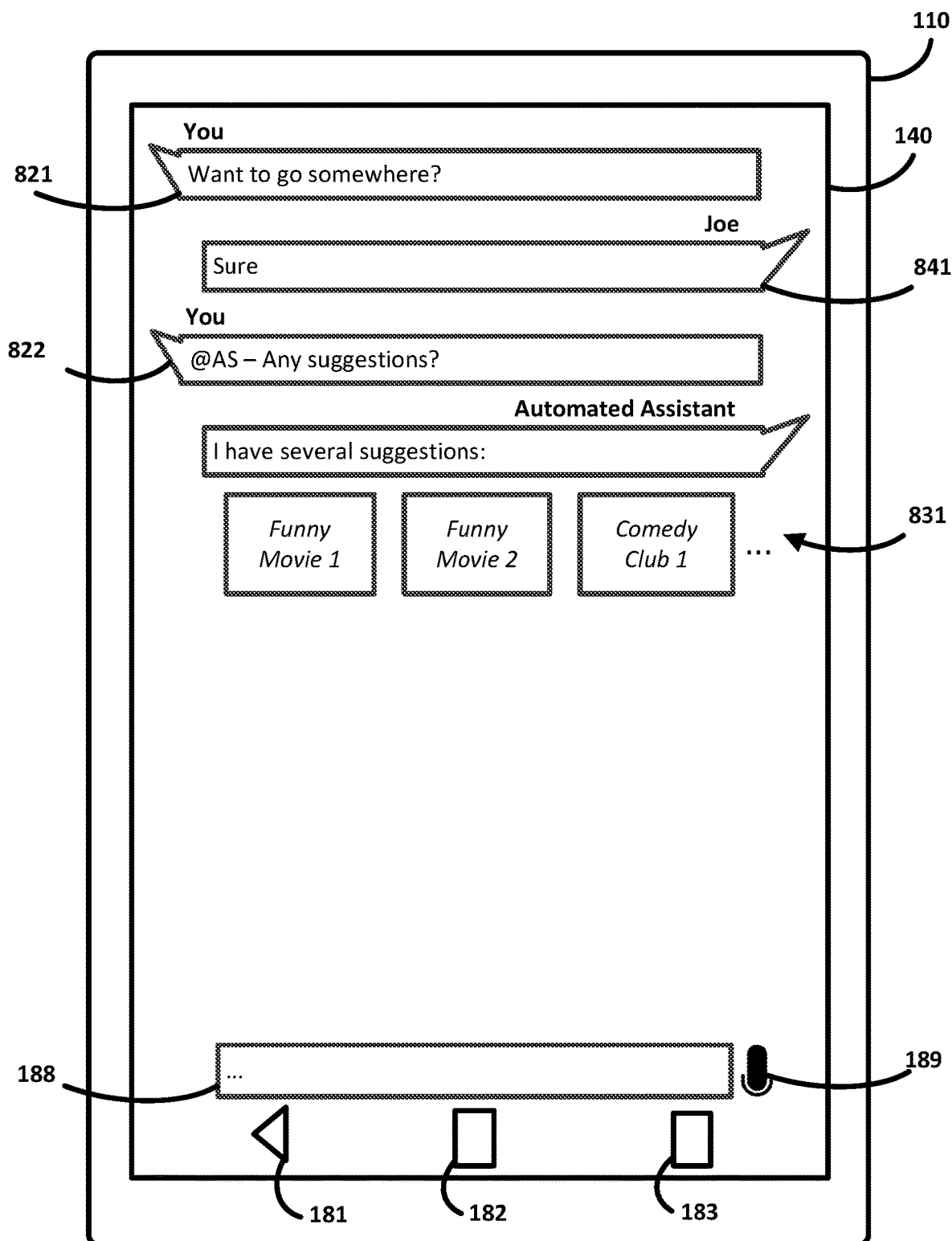
FIGS. 8 and 9 illustrate the example client computing device of FIG. 3A, displaying examples of dialog that includes multiple users and the automated assistant.
Figure 9:
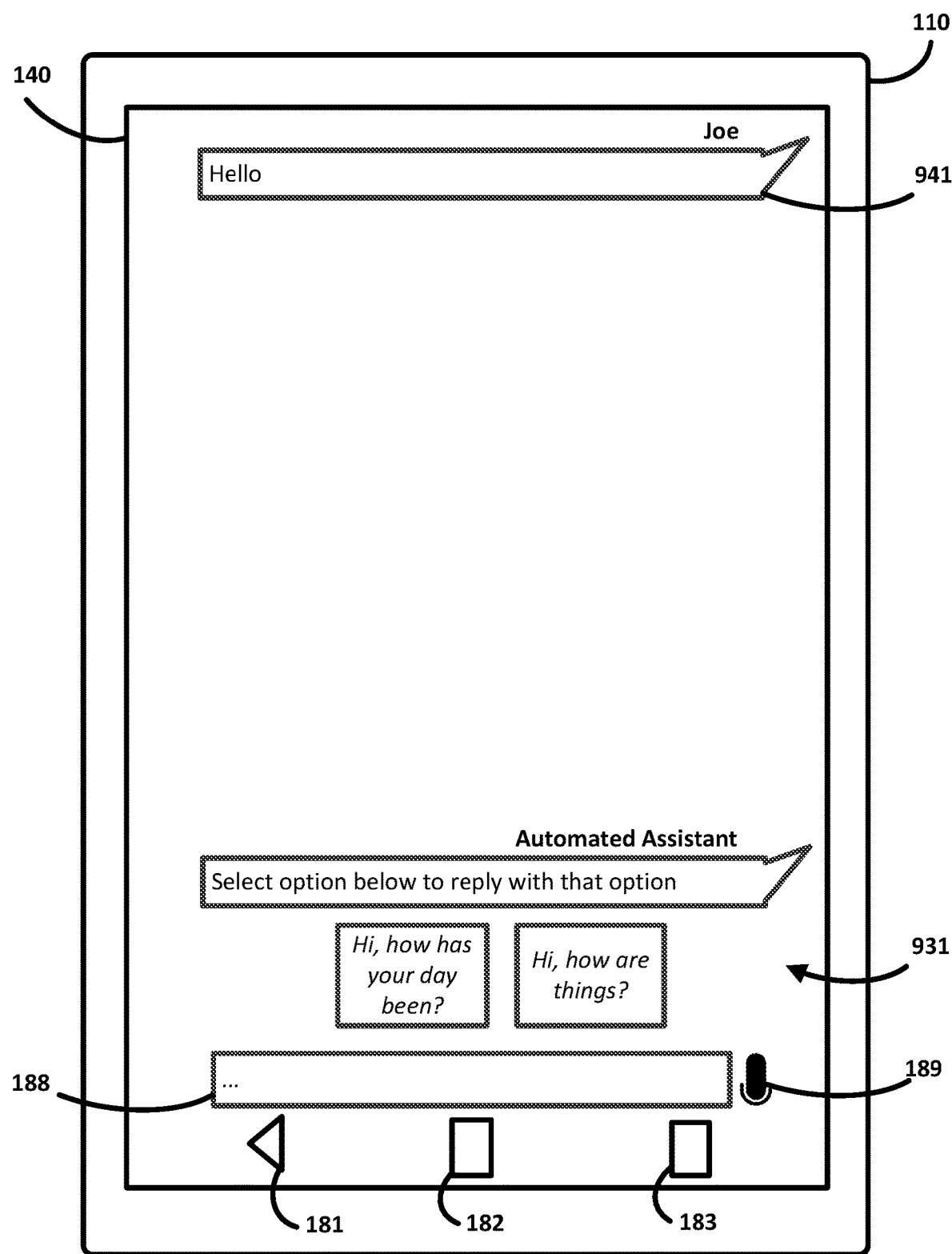

FIGS. 8 and 9 present two examples of dialogs that include the user of the computing device 110 and an additional user ("Joe"). Although FIGS. 8 and 9 only illustrate one additional user, it is understood that multiple additional users may be engaged in a dialog.

In FIG. 8, the user of the computing device 110 provides textual input 821 in the dialog and the additional user ("Joe") provides a responsive reply 841 in the dialog. The user of the computing device 110 then provides an additional textual input 822 that is directed to the automated assistant 120. The textual input is directed to the automated assistant 120 by the inclusion of "@AS". In some implementations, additional or alternative techniques for invoking the automated assistant 120 may be utilized and/or the automated assistant 120 may optionally provide responsive content without explicit invocation.

In response to the textual input 822, the automated assistant provides a reply 831 that is based on the textual input 822 and based on the user state information of the user of the computing device 110 and/or of the additional user ("Joe"). For example, the user state information may be indicative of both the user of the computing device 110 and the additional user being "giddy", and the reply 831 may be generated based on issuing a search that includes one or more search parameters that are based on the textual input 822 and that includes one or more search parameters that are based on that user state information. For example, the reply content engine 126 may cause a search to be issued for "funny events nearby", where "funny" is chosen based on the "giddy" user state and/or may cause the search results to be ranked based at least in part on whether they have a "funny" or similar attribute. For instance, search results that do not have a "funny" attribute may be filtered out of the search results. The reply 831 includes three of the search results identified in response to the search. Each of the search results relates to a "funny" event. Selection of one of the search results by the user may cause additional information about the corresponding event to be presented to the user. In some implementations, the additional information may be presented as a continuation of the ongoing dialog. In some other implementations, selection of one of the search results may cause the additional information to be presented to the selecting user in a separate application and/or interface.

In FIG. 9, the additional user ("Joe") provides textual input 941 that is a message directed to the user of the computing device 110. The automated assistant 120 generates responsive reply content 931. However, instead of automatically incorporating the responsive reply content 931 into the dialog, the automated assistant 120 provides the responsive reply content to the user of the computing device 110 (optionally without separately providing it to the additional user). The user of the computing device 110 may optionally select one of the two reply options listed in the reply content 931 to utilize the selected option as a reply, by the user of the computing device 110, to the textual input 941. Selection of one of the options may cause the selected option to be automatically included in the transcript of the dialog presented in the graphical user interface of FIG. 9, may populate the text of the selected option in the textual reply interface element 188 (for optional editing by the user prior to explicit submission by the user), or may otherwise enable editing by the user of the computing device 110 and/or require an additional explicit input of the user of the computing device 110 prior to inclusion in the transcript of the dialog.

The automated assistant 120 may generate the reply options of reply content 931 based on determined user state information for the additional user ("Joe"). For example, the user state information for the additional user may indicate that he is "sad" and, as a result, the reply content engine 126 may generate reply content that conforms to that user state information. For instance, the text generation engine 124 may generate an initial textual output based on the textual input 941, and the reply content engine 126 may modify that initial textual input based on the user state information for the additional user.

Figure 10:
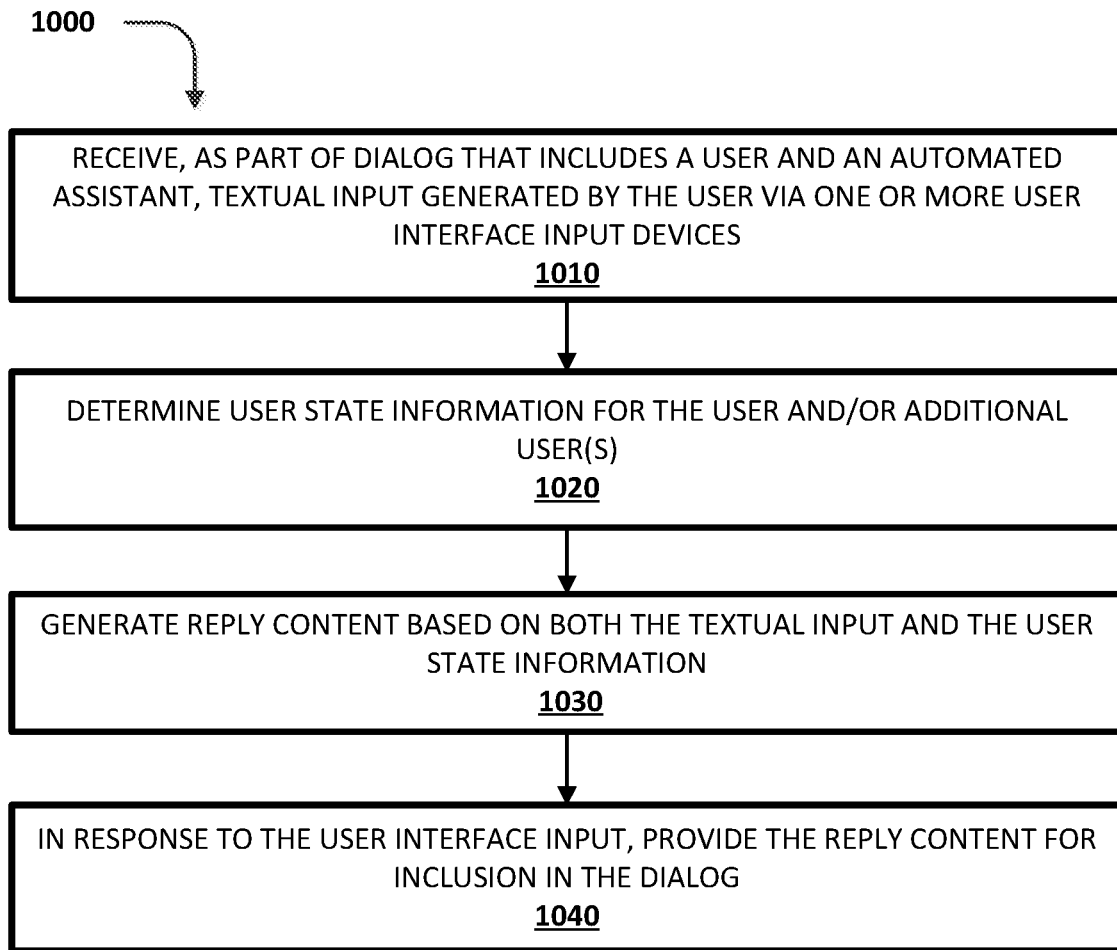
FIG. 10 is a flowchart illustrating an example method according to implementations disclosed herein.

FIG. 10 is a flowchart illustrating an example method 1000 according to implementations disclosed herein. For convenience, the operations of the flow chart are described with reference to a system that performs the operations. This system may include various components of various computer systems, such as one or more components of automated assistant 120 and/or search system 130. Moreover, while operations of method 1000 are shown in a particular order, this is not meant to be limiting. One or more operations may be reordered, omitted or added.

At block 1010, the system receives textual input. The system receives the textual input as part of a dialog that includes a user, an automated assistant, and optionally one or more additional users. The textual input may be generated by the user based on user interface input generated by one or more user interface input devices, such as a microphone and/or virtual keyboard.

At block 1020, the system determines user state information for the user that submitted the textual input and/or for one or more additional users. The system may utilize various inputs and/or various techniques in determining the user state information. For example, the system may determine the user state information for the user based on sensor data of user interface input device(s) of the user, other sensor(s) of the user, the textual input received at block 1010, and/or prior textual input received from the user. In some implementations, block 1020 may occur prior to block 1010.

At block 1030, the system generates reply content based on both the textual input and the user state information. The system may generate various types of reply content and may utilize various techniques to generate the reply content based on both the textual input and the user state information. For example, the system may utilize one or more of the techniques described with respect to earlier figures.

At block 1040, the system provides the reply content for inclusion in the dialog. The system provides the reply content in response to the user interface input of block 1010. In some implementations, the system automatically incorporates the reply content in the dialog as a reply, by the system, to the textual input of block 1010. For example, the system may provide one or more commands to one or more computing devices of users engaged in the dialog to cause those computing devices to present the reply content (e.g., to incorporate the reply content in a transcript of the dialog). In some implementations, the system suggests the reply content to the user for inclusion in the dialog (e.g., by a general indication that reply content is available), and only includes the reply content in the dialog in response to further user interface input. In some implementations, the system suggests the reply content to an additional user involved in the dialog as a reply, by the additional user, to the textual input of block 1010.

Multiple iterations of blocks 1010, 1020, 1030, and 1040 may occur during a dialog to enable reply content to be adapted to various user states and/or textual inputs that may occur throughout the dialog. Although blocks 1010, 1020, 1030, and 1040 are illustrated in a particular order, it is understood the order may be altered, one or more blocks may be performed in parallel, and/or one or more blocks may only be selectively performed.

Figure 11:
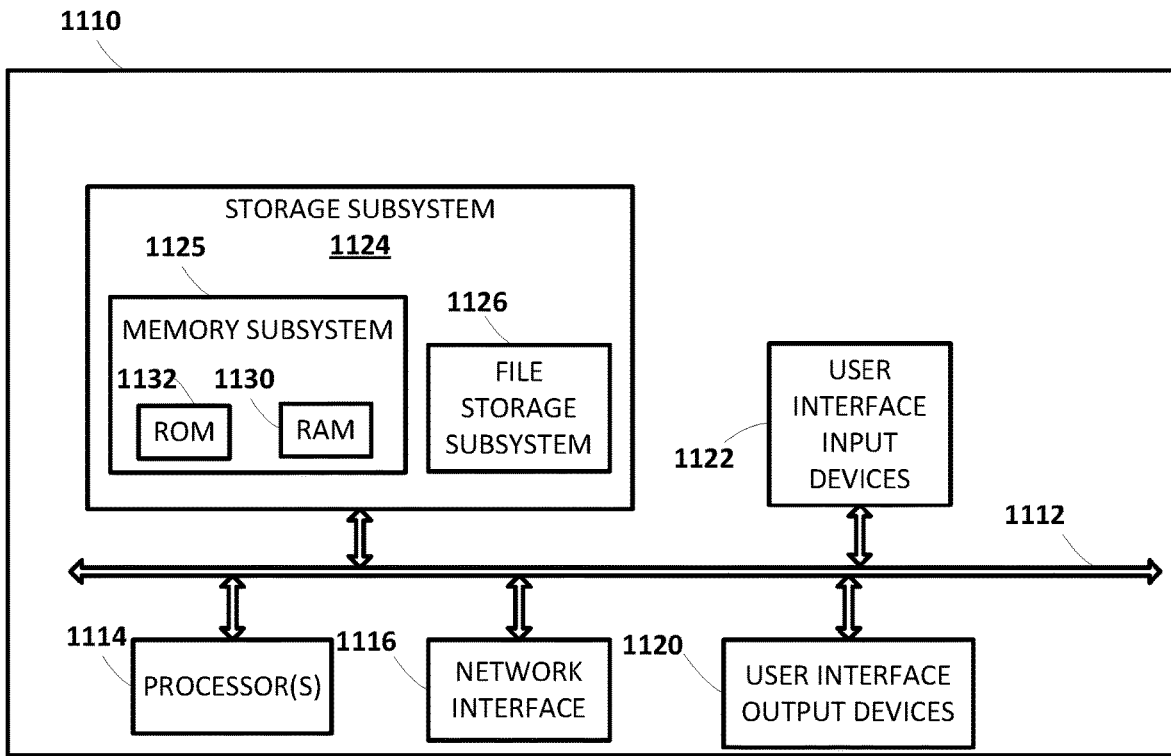
FIG. 11 illustrates an example architecture of a computing device.

FIG. 11 is a block diagram of an example computing device 1110 that may optionally be utilized to perform one or more aspects of techniques described herein. In some implementations, one or more of a client computing device, automated assistant 120, and/or other component(s) may comprise one or more components of the example computing device 1110.

Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the method of FIG. 10.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

In situations in which certain implementations discussed herein may collect or use personal information about users (e.g., user data extracted from other electronic messages, information about a user's social network, a user's location, a user's biometric information, and a user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method comprising:
   receiving input from a first user via one or more input devices of a first computing device of the first user, wherein the input is provided to an automated assistant implemented by one or more processors;
   determining first user state information for the first user, wherein the first user state information identifies a state of the first user, is in addition to the input, and is based on sensor data generated by the first computing device of the first user or an additional computing device of the first user;
   determining that the first user state information indicates at least a threshold change from prior user state information of the first user;
   generating first reply content to the input, the first reply content based on the input and on the first user state information, wherein generating the first reply content includes determining at least one selectable graphical element in response to determining that the first user state information indicates the at least the threshold change from the prior user state information of the first user, wherein the at least one selectable graphical element, when selected by user selection input, causes a network connection to be established with a second computing device of a second user; and
   providing the first reply content via one or more user interface output devices.

2. The computer-implemented method of claim 1, further comprising:
   receiving selection of the selectable graphical element; and
   in response to receiving the selection of the selectable graphical element, causing the first computing device of the first user to establish the network connection with the second computing device of the second user.

3. The computer-implemented method of claim 2, further comprising, in response to receiving the selection of the selectable graphical element, causing the first computing device of the first user to present additional content via at least one of the one or more user interface output devices to initiate a dialog with the second user, wherein the dialog enables communication between the first computing device of the first user and the second computing device of the second user.

4. The computer-implemented method of claim 3, wherein the communication between the first computing device of the first user and the second computing device of the second user includes displaying information via a graphical interface displayed by the first computing device of the first user.

5. The computer-implemented method of claim 3, wherein the communication between the first computing device of the first user and the second computing device of the second user is enabled by a separate application executing on the first computing device of the first user.

6. The computer-implemented method of claim 1, wherein determining that the first user state information indicates the at least the threshold change from the prior user state information of the first user includes determining that the at least the threshold change is in a direction opposite from the prior user state information of the first user.

7. The computer-implemented method of claim 1, wherein determining that the first user state information indicates the at least the threshold change from the prior user state information of the first user includes determining that the at least the threshold change is a threshold magnitude of change from the prior user state information of the first user.

8. The computer-implemented method of claim 1, wherein determining the first user state information comprises:
   identifying a plurality of first user state indicators based on the sensor data;
   applying the first user state indicators as input to at least one user state model stored in one or more computer readable media; and
   generating, over the at least one user state model and based on the first user state indicators, output that indicates the first user state information.

9. The computer-implemented method of claim 1, further comprising:
   determining second user state information for the second user;
   generating second reply content based on the input generated by the first user, the first user state information, and the second user state information; and
   providing the second reply content for presentation to the first computing device of the first user and to the second computing device of the second user.

10. The computer-implemented method of claim 1, wherein the sensor data is obtained from one or more sensors of the first computing device of the first user or of the additional computing device of the first user, wherein the one or more sensors include at least one of a camera, a geographical location sensor, an accelerometer, or a gyroscope.

11. A system comprising:
   a memory; and
   one or more processors coupled to the memory and configured to execute instructions stored in the memory, and wherein the instructions cause performance of operations comprising:
      receiving input from a first user via one or more input devices of a first computing device of the first user, wherein the input is provided to an automated assistant implemented by the one or more processors;

determining first user state information for the first user, wherein the first user state information identifies a state of the first user, is in addition to the input, and is based on sensor data generated by the first computing device of the first user or an additional computing device of the first user;

determining that the first user state information indicates at least a threshold change from prior user state information of the first user;

generating first reply content to the input, the first reply content based on the input and on the first user state information, wherein generating the first reply content includes determining at least one selectable graphical element in response to determining that the first user state information indicates the at least the threshold change from the prior user state information of the first user, wherein the at least one selectable graphical element, when selected by user selection input, causes a network connection to be established with a second computing device of a second user; and providing the first reply content for presentation via one or more user interface output devices.

12. The system of claim 11, wherein the instructions cause performance of further operations comprising:

receiving selection of the selectable graphical element; and in response to receiving the selection of the selectable graphical element, causing the first computing device of the first user to establish the network connection with the second computing device of the second user.

13. The system of claim 12, wherein the instructions cause performance of further operations comprising, in response to receiving the selection of the selectable graphical element, causing the first computing device of the first user to present additional content via at least one of the one or more user interface output devices to initiate a dialog with the second user, wherein the dialog enables communication between the first computing device of the first user and the second computing device of the second user.

14. The system of claim 13, wherein the communication between the first computing device of the first user and the second computing device of the second user is enabled by a separate application executing on the first computing device of the first user.

15. The system of claim 11, wherein the operation of determining that the first user state information indicates the at least the threshold change from the prior user state information of the first user includes determining that the at least the threshold change is in a direction opposite from the prior user state information of the first user.

16. The system of claim 11, wherein the operation of determining that the first user state information indicates the at least the threshold change from the prior user state information of the first user includes determining that the at least the threshold change is a threshold magnitude of change from the prior user state information of the first user.

17. The system of claim 11, wherein the sensor data is obtained from one or more sensors of the first computing device of the first user or of the additional computing device of the first user, wherein the one or more sensors include at least one of a camera, a geographical location sensor, an accelerometer, or a gyroscope.

18. A non-transitory computer-readable medium comprising one or more instructions stored thereon that, when executed by a processor, cause the processor to perform operations comprising:

receiving input from a first user via one or more input devices of a first computing device of the first user, wherein the input is provided to an automated assistant;

determining first user state information for the first user, wherein the first user state information identifies a state of the first user, is in addition to the input, and is based on sensor data generated by the first computing device of the first user or an additional computing device of the first user;

determining that the first user state information indicates at least a threshold degree of change from prior user state information of the first user;

generating first reply content to the input, the first reply content based on the input and on the first user state information, wherein generating the first reply content includes determining at least one selectable graphical element in response to determining that the first user state information indicates the at least the threshold degree of change from the prior user state information of the first user, wherein the at least one selectable graphical element, when selected by user selection input, causes a network connection to be established with a second computing device of a second user; and providing the first reply content for presentation via one or more user interface output devices.

19. The non-transitory computer-readable medium of claim 18, wherein the operations further comprise:

receiving selection of the selectable graphical element; and in response to receiving the selection of the selectable graphical element:
  causing the first computing device of the first user to establish the network connection with the second computing device of the second user; and
  causing the first computing device of the first user to present additional content via at least one of the one or more user interface output devices to initiate a dialog with the second user, wherein the dialog enables communication between the first computing device of the first user and the second computing device of the second user.

20. The non-transitory computer-readable medium of claim 18, wherein the operation of determining that the first user state information indicates the at least the threshold degree of change from the prior user state information of the first user includes determining that the at least the threshold degree of change is in a direction opposite from the prior user state information of the first user.

* * * * *